US008872867B2

(12) United States Patent
Yamashita et al.

(10) Patent No.: US 8,872,867 B2

(45) Date of Patent: Oct. 28, 2014

(54) SIGNAL PROCESSING DEVICE, SIGNAL PROCESSING METHOD, DISPLAY DEVICE, AND ELECTRONIC APPARATUS

(75) Inventors: Junichi Yamashita, Tokyo (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 369 days.

(21) Appl. No.: 13/323,380

(22) Filed: Dec. 12, 2011

(65) Prior Publication Data

US 2012/0162285 A1 Jun. 28, 2012

(30) Foreign Application Priority Data

Dec. 28, 2010 (JP) ................................ 2010-291840

(51) Int. Cl.

| | |
|---|---|
| ***G09G 5/10*** | (2006.01) |
| ***G06F 3/038*** | (2013.01) |
| ***G09G 5/00*** | (2006.01) |
| ***G09G 3/32*** | (2006.01) |

(52) U.S. Cl.

CPC ............ *G09G 3/32* (2013.01); *G09G 2320/048* (2013.01); *G09G 2300/0819* (2013.01); *G09G 2320/043* (2013.01); *G09G 2300/0413* (2013.01); *G09G 2360/145* (2013.01); *G09G 2320/029* (2013.01); *G09G 2300/0866* (2013.01); *G09G 2300/08424* (2013.01)

USPC ............... 345/690; 345/204; 345/36; 345/44; 345/45; 345/46

(58) Field of Classification Search

CPC .................. G09G 2320/043; G09G 2320/045; G09G 2320/046; G09G 2320/048

USPC ................... 345/36, 44–46, 204–215, 76–83; 315/169.3; 313/463, 504

See application file for complete search history.

(56) References Cited

U.S. PATENT DOCUMENTS

| | | | | |
|---|---|---|---|---|
| 5,502,508 | A * | 3/1996 | Kawabata et al. | 348/652 |
| 6,084,567 | A * | 7/2000 | Ogawa | 345/690 |
| 8,035,663 | B2 * | 10/2011 | Ishii et al. | 345/690 |
| 8,084,950 | B2 * | 12/2011 | Kawasaki | 315/169.3 |
| 8,274,456 | B2 * | 9/2012 | Hayakawa et al. | 345/76 |

(Continued)

FOREIGN PATENT DOCUMENTS

| | | |
|---|---|---|
| JP | 2002-258792 A | 9/2002 |
| JP | 2004-146936 A | 5/2004 |

(Continued)

*Primary Examiner* — Joe H Cheng

*Assistant Examiner* — Hang Lin

(74) *Attorney, Agent, or Firm* — Rader, Fishman & Grauer PLLC

(57) ABSTRACT

A signal processing device measures an actual luminance of a light-emitting device by setting levels of gradation values indicating the degree of light emission to a pixel circuit having the light-emitting device to generate measurement information. The device also calculates gradation deterioration characteristics based on the measurement information and the relationship between a gradation value and a luminance value when the pixel circuit is in a correction reference state. A deterioration value calculation calculates a conversion efficiency deterioration value of conversion efficiency for the light-emitting device to convert a driving current supplied for a gradation value into a luminance to generate conversion efficiency deterioration characteristic information. Finally, the device calculates current amount deterioration value that calculates a current amount deterioration value regarding deterioration of a driving current of the pixel circuit based on the gradation deterioration characteristic to generate current amount deterioration characteristic information of the prescribed pixel circuit.

10 Claims, 19 Drawing Sheets

(56) References Cited

U.S. PATENT DOCUMENTS

| | | | | |
|---|---|---|---|---|
| 8,493,299 | B2 * | 7/2013 | Shiomi et al. | 345/87 |
| 2005/0024311 | A1 * | 2/2005 | Takahashi et al. | 345/89 |
| 2005/0156831 | A1 * | 7/2005 | Yamazaki et al. | 345/76 |
| 2007/0097038 | A1 * | 5/2007 | Yamazaki et al. | 345/76 |
| 2008/0150839 | A1 * | 6/2008 | Kawabe | 345/63 |
| 2008/0170007 | A1 * | 7/2008 | Tanada | 345/76 |
| 2009/0040156 | A1 * | 2/2009 | Jun et al. | 345/87 |
| 2009/0081816 | A1 * | 3/2009 | Yamazaki et al. | 438/10 |
| 2010/0265277 | A1 * | 10/2010 | Takahara | 345/690 |
| 2011/0069061 | A1 * | 3/2011 | Nakamura | 345/214 |
| 2011/0075038 | A1 * | 3/2011 | Yamazaki et al. | 348/615 |
| 2012/0120126 | A1 * | 5/2012 | Yamazaki et al. | 345/690 |
| 2012/0162285 | A1 * | 6/2012 | Yamashita et al. | 345/690 |

FOREIGN PATENT DOCUMENTS

| | | | | |
|---|---|---|---|---|
| JP | 2007171507 | A | * | 7/2007 |
| JP | 2007187761 | A | * | 7/2007 |
| JP | 2007187762 | A | * | 7/2007 |
| JP | 2007-240803 | A | | 9/2007 |
| JP | 2008-122516 | A | | 5/2008 |
| JP | 2008-176274 | | | 7/2008 |
| JP | 2008176274 | A | * | 7/2008 |
| JP | 2009244527 | A | * | 10/2009 |
| JP | 2009244528 | A | * | 10/2009 |
| JP | 2010-139836 | A | | 6/2010 |
| JP | 2010-139837 | A | | 6/2010 |
| JP | 2010-139838 | A | | 6/2010 |

* cited by examiner

GRADATION DETERIORATION INFORMATION

740

| INPUT GRADATION VALUE | CONVERSION GRADATION VALUE |
|---|---|
| 1000 | 820 |
| 800 | 624 |
| 600 | 428 |
| 400 | 230 |

GRADATION DETERIORATION CHARACTERISTIC GRAPH

731 MEASUREMENT INFORMATION (NON-EMISSION)

| GRADATION VALUE | LUMINANCE VALUE |
|---|---|
| 800 | 800 |
| 600 | 600 |
| 400 | 400 |
| 200 | 200 |
| ⋮ | ⋮ |

732 MEASUREMENT INFORMATION (EMISSION FOR "t" PERIOD)

| GRADATION VALUE | LUMINANCE VALUE |
|---|---|
| 800 | 609 |
| 600 | 331 |
| 400 | 135 |
| 200 | 29 |
| ⋮ | ⋮ |

742 GRADATION DETERIORATION INFORMATION (FOR GRADATION VALUE 200)

| INPUT GRADATION VALUE | CONVERSION GRADATION VALUE |
|---|---|
| 800 | 624 |
| 600 | 428 |
| 400 | 230 |
| 200 | 33 |
| ⋮ | ⋮ |

| INPUT GRADATION VALUE | CONVERSION GRADATION VALUE |
|---|---|
| 800 | 624 |
| 600 | 428 |
| 400 | 230 |
| 200 | 33 |
| ⋮ | ⋮ |

| ELAPSED TIME | CONVERSION EFFICIENCY DETERIORATION VALUE |
|---|---|
| 0 | 0 |
| 100 | 20 |
| ⋮ | ⋮ |
| 1000 | 60 |
| ⋮ | ⋮ |

| ELAPSED TIME | CURRENT AMOUNT DETERIORATION VALUE |
|---|---|
| 0 | 0 |
| 100 | 10 |
| ⋮ | ⋮ |
| 1000 | 50 |
| ⋮ | ⋮ |

EXAMPLE OF CONVERSION EFFICIENCY DETERIORATION CURVE

EXAMPLE OF CURRENT AMOUNT DETERIORATION CURVE

SIGNAL PROCESSING DEVICE, SIGNAL PROCESSING METHOD, DISPLAY DEVICE, AND ELECTRONIC APPARATUS

FIELD

The present disclosure relates to a signal processing device and method for correcting deterioration components of light-emitting devices used for displaying images, and a display device and an electronic apparatus each including the signal processing device.

BACKGROUND

A display device which includes a pixel unit in which a plurality of pixels are arranged in a matrix form and which controls the pixel unit in accordance with image information to be displayed to thereby display images is known. In recent years, a display device in which self-light-emitting devices (for example, organic EL (Electroluminescence) elements) are used in the pixel unit has attracted attention. In such a display device, pixel circuits including organic EL elements are arranged in a matrix form to form a display screen. However, since the organic EL element expresses a gradation by changing the amount of luminescence in accordance with image data to be displayed, the degree of deterioration of the organic EL element is different from one pixel circuit to another. Thus, with the elapse of time, a pixel in which the degree of deterioration is large and a pixel in which the degree of deterioration is small coexist on the display screen. In this case, a phenomenon (commonly known as burn-in) occurs in which a previously displayed image appears to remain on the display screen since the pixel in which the degree of deterioration is large becomes darker than the neighboring pixels.

In order to prevent such a burn-in phenomenon, a display device in which deterioration of a light-emitting device in which the degree of deterioration is small is caused to progress during a non-use period so that the degree of deterioration thereof becomes equal to that of a light-emitting device in which the degree of deterioration is large is proposed (for example, see JP-A-2008-176274).

SUMMARY

However, in the display device in which deterioration of a light-emitting device in which the degree of deterioration is small is caused to progress during a non-use period so that the degree of deterioration thereof becomes equal to that of a light-emitting device in which the degree of deterioration is large, there is a possibility that deterioration of whole light-emitting devices is caused to progress. Moreover, since correction of burn-in is performed during the non-use period of the display device, there is another problem in that it is not possible to correct burn-in during the use of the display device. Therefore, a method of correcting burn-in by changing the gradation value of a video signal taking deterioration of a light-emitting device itself during the use of the display device into consideration may be considered.

For example, a method in which the gradation value of a video signal is designated in accordance with the degree of deterioration of a pixel circuit that displays the video signal, and a light-emitting device is caused to emit light using the changed video signal may be considered. For example, deterioration information in which a driving time of a general pixel circuit is correlated with the degree of deterioration of luminance may be stored in advance in a device, and the gradation value of a video signal may be changed in response to the elapse of the driving time and in accordance with the amount of deterioration of luminance of respective pixels, which is estimated based on the deterioration information. However, the degree of deterioration of pixels is different from one pixel circuit to another, and the video signal supplied to a pixel circuit is also different from one display target to another. Thus, it is not easy to perform burn-in correction with high accuracy using general deterioration information.

Moreover, in general, when deterioration occurs, conversion efficiency deterioration wherein conversion efficiency of a light-emitting device deteriorates and current amount deterioration wherein a driving current of a pixel circuit decreases occur. Thus, when generating deterioration information by measuring the deterioration state of a pixel circuit, it is not easy to separate a conversion efficiency deterioration component and a current amount deterioration component from the measured value.

It is therefore desirable to provide a signal processing device and method capable of correcting burn-in with high accuracy by obtaining highly accurate deterioration information and a display device and an electronic apparatus each including the signal processing device.

An embodiment of the present disclosure is directed to a signal processing device including a measuring unit, a gradation deterioration characteristic calculation unit, a conversion efficiency deterioration value calculation unit, and a current amount deterioration value calculation unit. The measuring unit measures an actual luminance of a light-emitting device every prescribed update period by setting a plurality of levels of gradation values indicating the degree of light emission to a prescribed pixel circuit having the light-emitting device. Moreover, the measuring unit generates measurement information in which the gradation value and the measured luminance value are correlated with each other. The gradation deterioration characteristic calculation unit calculates gradation deterioration characteristic based on the measurement information and the relationship registered in advance between a gradation value and a luminance value when the prescribed pixel circuit is in a correction reference state, wherein a gradation value during measurement and a gradation value in the correction reference state producing the same luminance value are stored in the gradation deterioration characteristic so as to be correlated with each other. The conversion efficiency deterioration value calculation unit calculates a conversion efficiency deterioration value regarding deterioration of a conversion efficiency for the light-emitting device of the prescribed pixel circuit to convert a driving current supplied in accordance with a gradation value into a luminance based on the gradation deterioration characteristic. Moreover, the conversion efficiency deterioration value calculation unit generates conversion efficiency deterioration characteristic information of the prescribed pixel circuit. The current amount deterioration value calculation unit calculates a current amount deterioration value regarding deterioration of a driving current of the prescribed pixel circuit based on the gradation deterioration characteristic to thereby generate current amount deterioration characteristic information of the prescribed pixel circuit.

According to the signal processing device of the embodiment of the present disclosure, the measuring unit generates a plurality of levels of gradation values set to the prescribed pixel circuit and the luminance values corresponding to the gradation values every prescribed update period. The gradation deterioration characteristic calculation unit correlates the gradation value during measurement and the gradation value in the correction reference state producing the same luminance with each other to thereby generate the gradation deterioration characteristic. The conversion efficiency deterioration value calculation unit calculates the conversion efficiency deterioration value based on the gradation deterioration characteristic to thereby generate the conversion efficiency deterioration characteristic information. The current amount deterioration value calculation unit calculates the current amount deterioration value based on the gradation deterioration characteristic to thereby generate the current amount deterioration characteristic information.

Another embodiment of the present disclosure is directed to a signal processing method, a display device, and an electronic apparatus which perform the same signal processing as the signal processing device described above.

According to the signal processing device, the signal processing method, the display device, and the electronic apparatus of the embodiment of the present disclosure, it is possible to obtain the conversion efficiency deterioration characteristic information and the current amount deterioration characteristic information of a pixel circuit based on the measurement information measured using an actual pixel circuit. In this way, it is possible to obtain highly accurate conversion efficiency deterioration values and current amount deterioration values based on actual measurement values. Moreover, by performing burn-in correction based on the highly accurate conversion efficiency deterioration values and current amount deterioration values, it is possible to perform burn-in correction with high accuracy.

DETAILED DESCRIPTION

Figure 1:
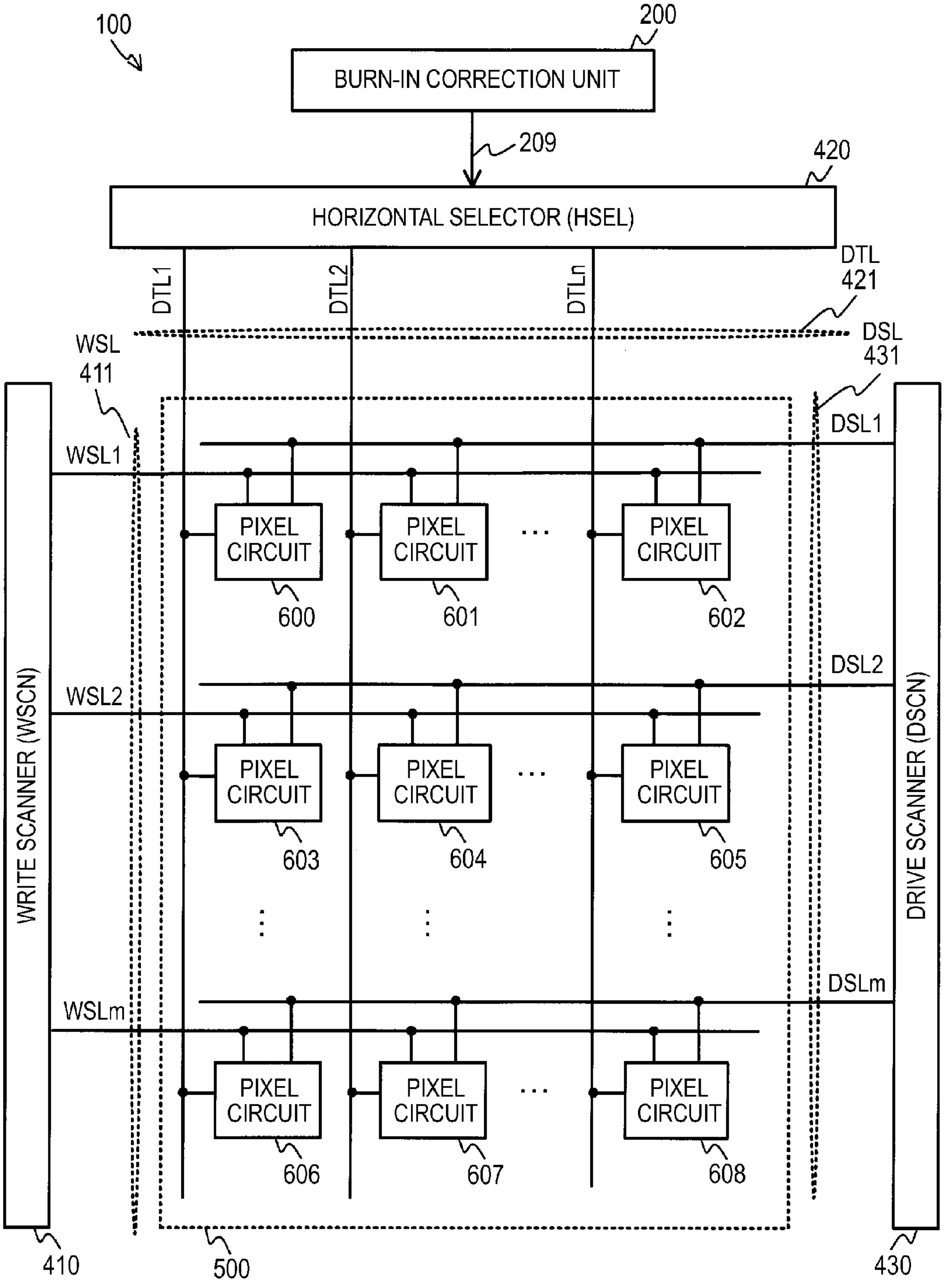
FIG. 1 is a conceptual diagram showing a configuration example of a display device according to an embodiment of the present disclosure.

FIG. 1 is a conceptual diagram showing a configuration example of a display device according to an embodiment of the present disclosure. A display device 100 includes a burn-in correction unit 200, a write scanner (WSCN: Write SCaNner) 410, a horizontal selector (HSEL: Horizontal SELector) 420, a drive scanner (DSCN: Drive SCaNner) 430, and a pixel array unit 500.

The pixel array unit 500 includes n×m pixel circuits 600 to 608 (where n and m are integers of 2 or more) which are arranged in a 2-dimensional matrix form. For the sake of convenience, nine pixel circuits 600 to 608 disposed on the first, second, and n-th columns of the first, second, and m-th rows are shown in FIG. 1. The pixel circuits 600 to 608 are connected to the write scanner (WSCN) 410 through scan lines (WSL: Write Scan Line) 411, respectively. Moreover, the pixel circuits 600 to 608 are connected to the horizontal selector (HSEL) 420 through data lines (DTL: DaTa Line) 421, respectively, and to the drive scanner (DSCN) 430 through drive lines (DSL: Drive Scan Line) 431, respectively. In FIG. 1, for the sake of convenience, the numbers of columns (1, . . . , and n) and rows (1, . . . , and m) of connected pixel circuits are assigned to the scan lines (WSL) 411, the data lines (DTL) 421, and the drive lines (DSL) 431. For example, a scan line WSL1, a data line DTL1, and a drive line DSL1 are connected to a pixel circuit 600 disposed on the first column of the first row.

The burn-in correction unit 200 is a signal processing circuit which receives the gradation value of a video signal and corrects burn-in by changing the gradation value of the video signal in accordance with the degree of deterioration of each of the pixel circuits 600 to 608. The burn-in correction unit 200 may be configured as a signal processing device. Here, the gradation value is a driving signal for instructing the pixel circuits 600 to 608 to be driven so as to emit light at a prescribed luminance, and designates the level (step) representing the degree of light emission. For example, the magnitude of emission luminance can be expressed in 256 levels (gradations). It is assumed that emission luminance increases as the signal level of the gradation value increases. In addition, the gradation value of a video signal means the gradation value which is input to the burn-in correction unit 200 as a video signal for display. Here, a gradation value of a video signal of which the emission luminance is 200 nit when the pixel circuit 600 is in the initial state is referred to as a "gradation value 200". It is assumed that after the elapse of a prescribed period, due to deterioration of the pixel circuit 600, it is possible to obtain an emission luminance of 100 nit even when "gradation value 200" is output. Similarly, it is assumed that the emission luminance as of "gradation value 300" has been deteriorated to 200 nit from 300 nit of the initial state. In this case, the burn-in correction unit 200 changes the gradation value of an output video signal to "gradation value 400", for example, in order to obtain the luminance (200 nit) of the initial state of "gradation value 200". The burn-in correction unit 200 supplies the changed video signal to the horizontal selector (HSEL) 420 through a signal line 209. In this way, the pixel circuit 600 is caused to emit light at a luminance of 200 nit to thereby be able to correct burn-in.

The write scanner (WSCN) 410 performs line-sequential scanning wherein the pixel circuits 600 to 608 are sequentially scanned in units of rows. The horizontal selector (HSEL) 420 supplies data signal for setting the magnitude of emission luminance in the pixel circuits 600 to 608 to the pixel circuits 600 to 608 of respective columns in accordance with the line-sequential scanning by the write scanner (WSCN) 410. The drive scanner (DSCN) 430 generates a drive signal for driving the pixel circuits 600 to 608 in units of rows in accordance with the line-sequential scanning by the write scanner (WSCN) 410. Moreover, the pixel circuits 600 to 608 hold the potential of the video signal from the data lines (DTL) 421 based on an operation signal from the scanning lines (WSL) 411 and emit light for a prescribed period in accordance with the held potential.

Figure 2:
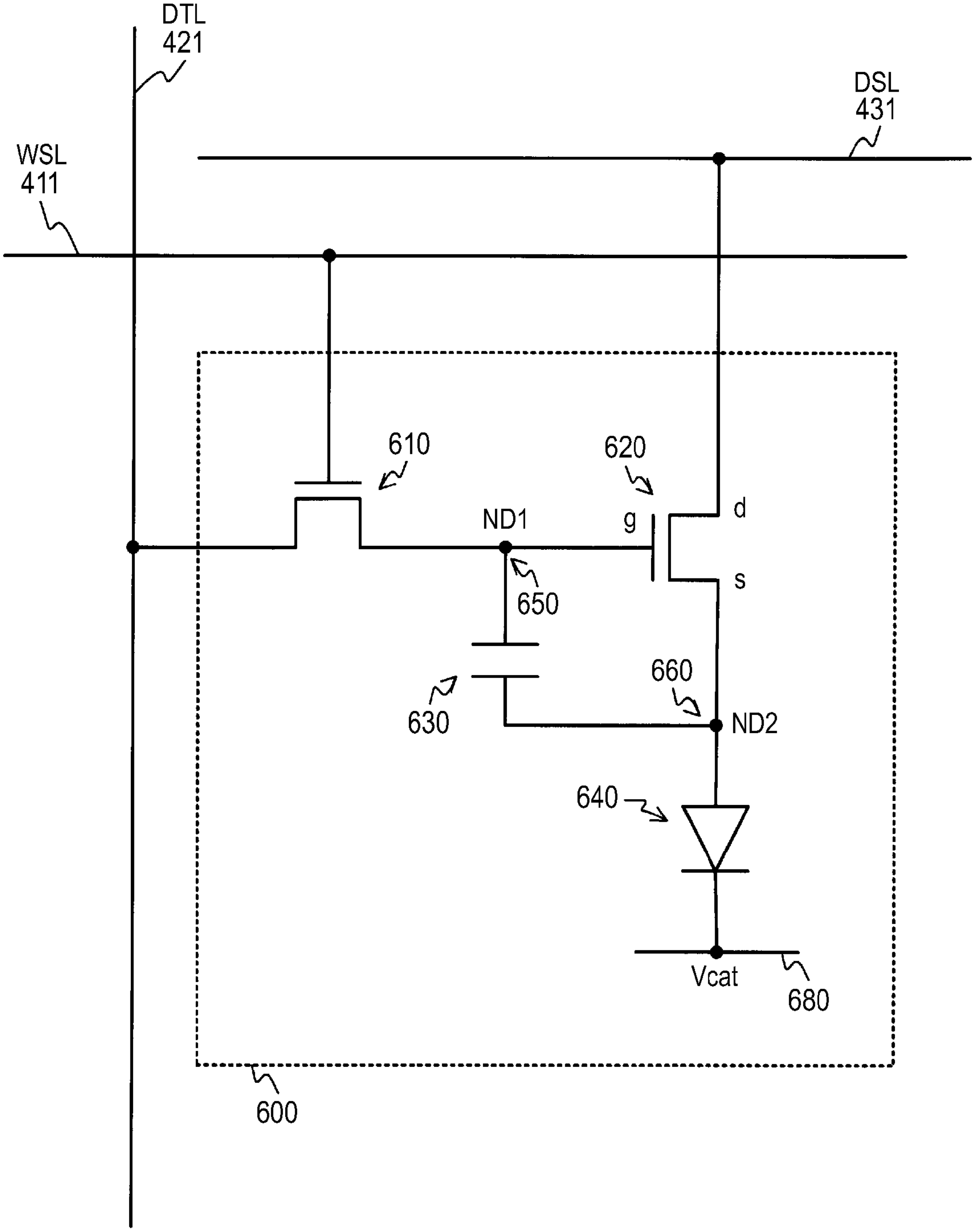
FIG. 2 is a circuit diagram schematically showing a configuration example of a pixel circuit.

FIG. 2 is a circuit diagram schematically showing a configuration example of a pixel circuit. Although FIG. 2 shows the pixel circuit 600, the other pixel circuits have the same configuration.

The pixel circuit 600 includes a writing transistor 610, a driving transistor 620, a hold capacitor 630, and a light-emitting device 640. In the example of FIG. 2, it is assumed that the writing transistor 610 and the driving transistor 620 are n-channel transistors. In addition, the writing transistor 610 and the driving transistor 620 are not limited to this combination. For example, the transistors 610 and 620 may be p-channel transistors, and may be enhancement, depletion, or dual-gate type transistors.

In the pixel circuit 600, the gate and drain terminals of the writing transistor 610 are connected to the scanning line (WSL) 411 and the data line (DTL) 421, respectively. Moreover, the source terminal of the writing transistor 610 is connected to the gate terminal (g) of the driving transistor 620 and one electrode (one end) of the hold capacitor 630. In FIG. 2, this connection node is referred to as a first node (ND1) 650. Moreover, the drain terminal (d) of the driving transistor 620 is connected to the drive line (DSL) 431. The source terminal (s) of the driving transistor 620 is connected to the other electrode (the other end) of the hold capacitor 630 and the anode terminal of the light-emitting device 640. In FIG. 2, this connection node is referred to as a second node (ND2) 660.

The writing transistor 610 is a transistor that supplies a data signal from the data line (DTL) 431 to the first node (ND1) 650 in accordance with the scanning signal from the scanning line (WSL) 411. The writing transistor 610 supplies a reference potential of a data signal to one end of the hold capacitor 630 in order to eliminate unevenness in the threshold of the driving transistor 620 of the pixel circuit 600. The reference potential mentioned herein is a fixed potential serving as a reference for causing the hold capacitor 630 to hold a voltage corresponding to the threshold voltage of the driving transistor 620. Moreover, the writing transistor 610 sequentially writes a signal potential of the data signal to one end of the hold capacitor 630 after the voltage corresponding to the threshold voltage of the driving transistor 620 is held in the hold capacitor 630.

The driving transistor 620 outputs a driving current to the light-emitting device 640 based on a signal voltage held in the hold capacitor 630 in accordance with the signal potential in order to cause the light-emitting device 640 to emit light. The driving transistor 620 outputs a driving current corresponding to the signal voltage held in the hold capacitor 630 to the light-emitting device 640 in a state where a driving potential for driving the driving transistor 620 is applied from the drive line (DSL) 431.

The hold capacitor 630 holds a voltage corresponding to the data signal supplied by the writing transistor 610. That is, the hold capacitor 630 performs a role of holding a signal voltage corresponding to the signal potential written by the writing transistor 610.

The light-emitting device 640 emits light in accordance with the magnitude of the driving current output from the driving transistor 620. Moreover, the light-emitting device 640 has an output terminal connected to a cathode line 680. From the cathode line 680, a cathode potential (Vcat) is supplied as a reference potential of the light-emitting device 640. The light-emitting device 640 can be realized by an organic EL element, for example.

In addition, the configuration of the pixel circuit 600 is not limited to the circuit configuration shown in FIG. 2. That is, any circuit configuration which includes the driving transistor 620 and the light-emitting device 640 can be applied to the pixel circuit 600. For example, light emission may be controlled with three or more transistors.

As described above, in the pixel circuit 600 of the display device 100, a driving current corresponding to the signal potential supplied through the data line (DTL) 421 is supplied to the light-emitting device 640, whereby the light-emitting device 640 emits light at a luminance corresponding to the driving current. Thus, when the driving transistor 620, the light-emitting device 640, or the like, which constitute the pixel circuit 600 deteriorates, the amount of the driving current or the amount of emission light changes. As a result, the value of luminance corresponding to a signal potential will be shifted from that of the initial state. If the same amount of shift occurs in all pixel circuits, a so-called burn-in phenomenon will not be caused. However, since an organic EL element expresses a gradation by changing the amount of emission light in accordance with image data to be displayed, the degree of deterioration of the organic EL element is different from one pixel circuit on the display screen to another. Thus, the burn-in phenomenon occurs since a pixel circuit in which the degree of deterioration is large becomes darker than the neighboring pixel circuits.

Figure 3:
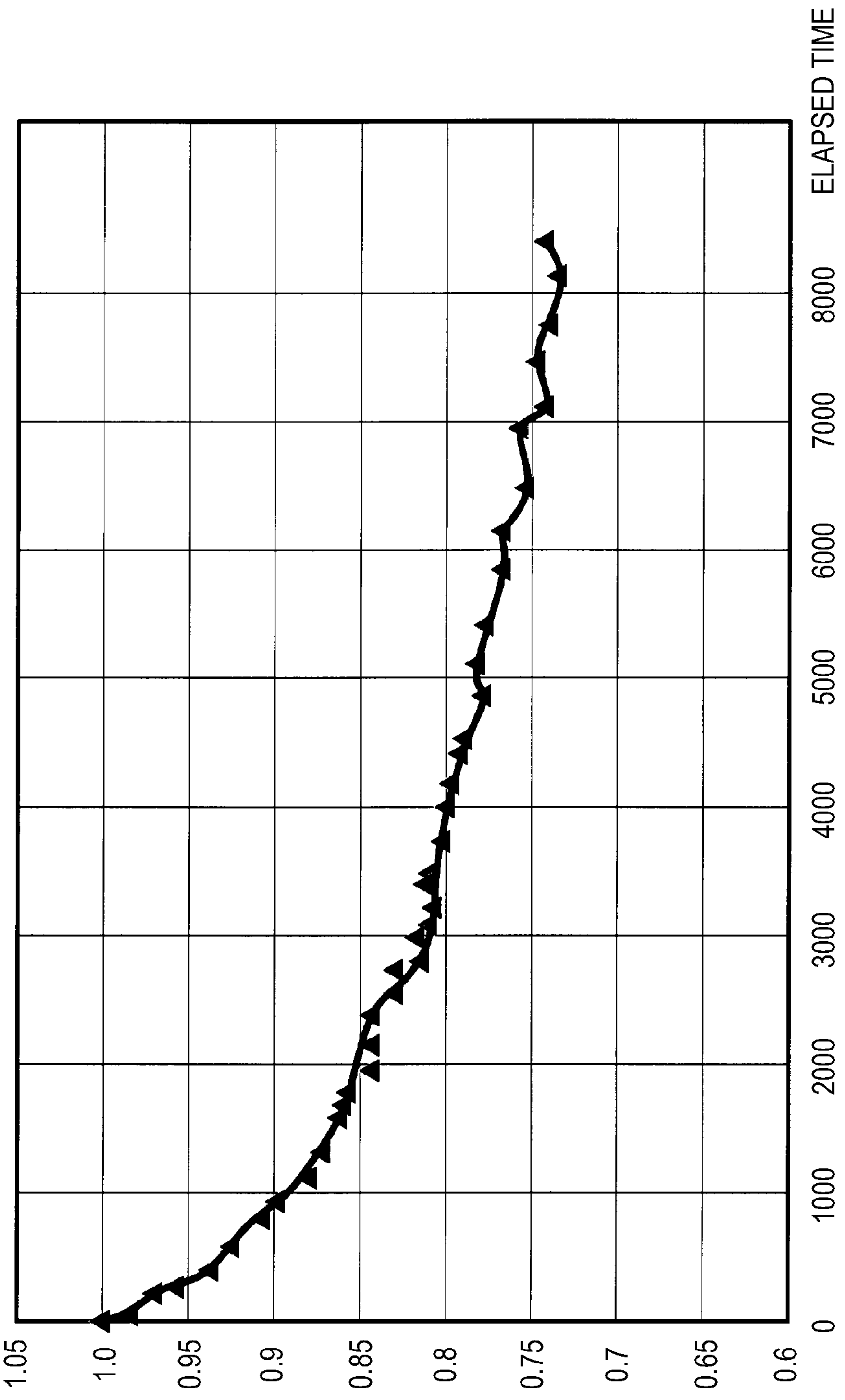
FIG. 3 is a graph showing an example of a change in luminance with the elapse of time, of a pixel circuit.

FIG. 3 is a graph showing an example of a change in luminance with the elapse of time, of a pixel circuit. FIG. 3 shows a change in the value (luminance value) of emission luminance with the elapse of time when in a pixel circuit having an organic EL element as a light-emitting device, the light-emitting device 640 is driven in response to a gradation value for emitting light at a luminance of 200 nit. The horizontal axis of FIG. 3 represents the elapsed time accumulated from the initial state. The vertical axis of FIG. 3 represents the ratio of time-varying luminance with the elapse of time to a reference luminance "200 nit" as a correction reference. Here, the initial state means a state when a target pixel circuit is in a correction reference state, and the elapsed time is set to "0" when the target pixel circuit is in the initial state. In the initial state where the elapsed time is "0", the ratio of the time-varying luminance to the reference luminance is "1.0".

That is, the time-varying luminance is 200 nit in the initial state. It can be understood from FIG. 3 that the luminance decreases as the driving time of the pixel circuit elapses. For example, when a period of 4000 hours elapses, the luminance obtained when the same gradation value as the initial state is output to the pixel circuit is “0.8” of that of the initial state, namely 160 nit. Thus, in order to obtain a luminance of 200 nit with the pixel circuit after the elapse of 4000 hours, a correction process of adding a correction amount corresponding to a luminance deterioration amount to the gradation value of a video signal may be performed. In this way, the pixel circuit will be able to emit light at an apparent luminance of 200 nit.

Figure 4:
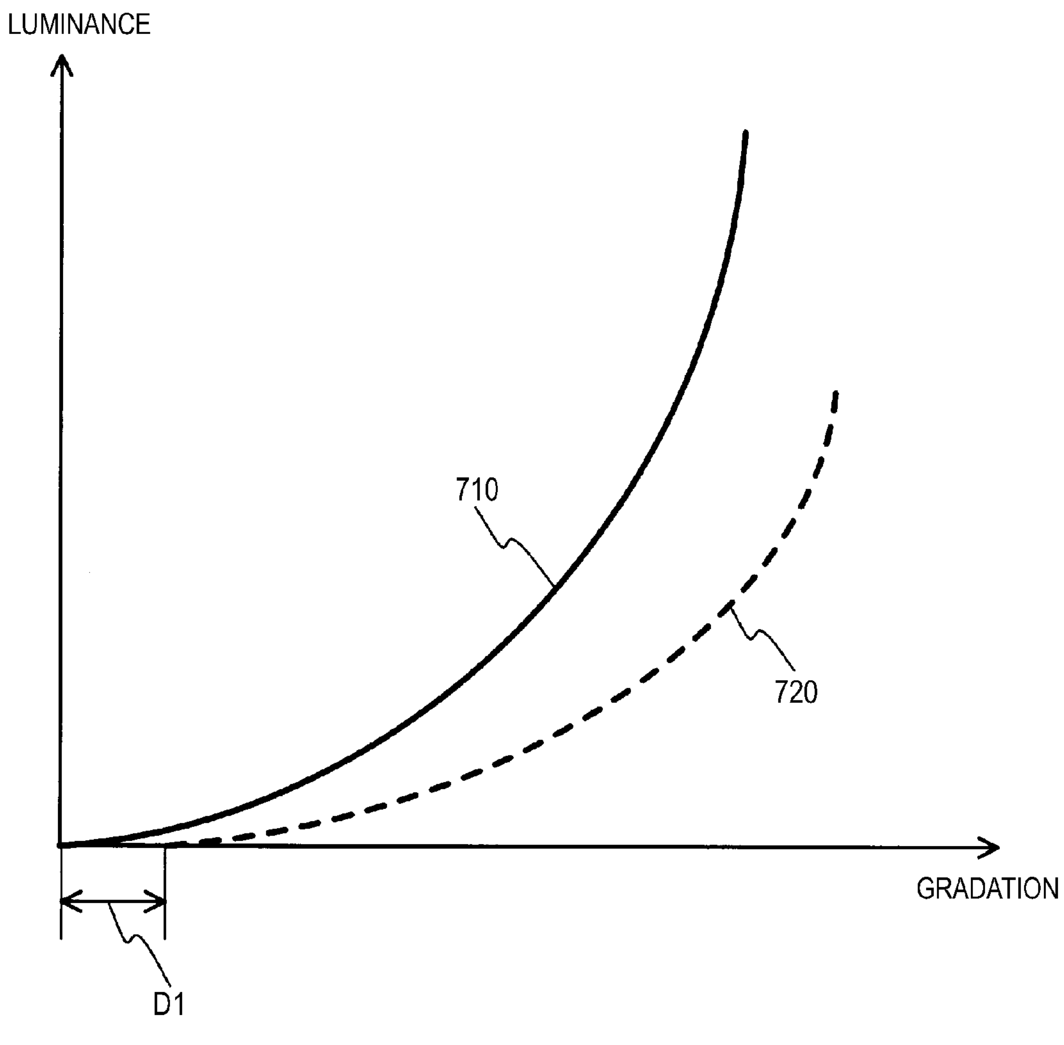
FIG. 4 is a graph showing the relationship between a gradation value of a video signal and a luminance value.

FIG. 4 is a graph showing the relationship between a gradation value of a video signal and a luminance value. The horizontal axis of FIG. 4 represents the gradation value of a video signal input to the burn-in correction unit 200, and the vertical axis represents the luminance values obtained in the pixel circuits 600 to 608. Moreover, a pixel characteristic curve (initial) 710 represents the relationship between an input gradation value and a luminance value in a pixel circuit in the initial state, and a pixel characteristic curve (deteriorated) 720 represents the relationship between an input gradation value and a luminance value in a pixel circuit after the elapse of time from the initial state.

The pixel characteristic curve (initial) 710 will be described. The pixel characteristic curve (initial) 710 is expressed by the following quadratic function, for example.

$$L=A\times S^2 \quad (1)$$

Here, “L” is a luminance value. Moreover, “A” is a coefficient (hereinafter referred to as a conversion efficiency) determined based on conversion efficiency when converting a driving current supplied to the light-emitting device 640 into a luminance. Furthermore, “$S^2$” is a value calculated using the square characteristics of the driving transistor 620 and is a value corresponding to the driving current supplied to the light-emitting device 640. As above, the luminance value L can be calculated by multiplying the conversion efficiency A of the light-emitting device 640 to the driving current $S^2$.

The pixel characteristic curve (deteriorated) 720 has a gentler slope than the pixel characteristic curve (initial) 710 since the light-emitting device 640 deteriorates with the elapse of time, and the conversion efficiency of converting a driving current to a luminance deteriorates. Moreover, the pixel characteristic curve (deteriorated) 720 is shifted rightward by an amount corresponding to a driving current amount decrease component D1 in the horizontal axis direction as compared to the pixel characteristic curve (initial) 710. The driving current amount decrease component D1 is a component indicating the amount (driving current decrease amount) of decrease in the driving current and occurs due to deterioration of the driving transistor 620 and the light-emitting device 640. That is, when the driving transistor 620 deteriorates, the amount of a driving current supplied to the light-emitting device 640 in accordance with a signal voltage decreases. Moreover, when the light-emitting device 640 deteriorates, since the threshold voltage of the light-emitting device 640 increases, the signal voltage decreases and the amount of the driving current decreases. As above, the driving current amount decrease component D1 occurs due to a decrease in the driving current amount supplied in accordance with the signal voltage and a decrease in the signal voltage.

In the pixel characteristic (initial) 710 expressed by Equation (1), the pixel characteristic (correction target) 720 in a state where the driving transistor 620 and the light-emitting device 640 deteriorate is expressed by the following quadratic function.

$$Ld=Ad\times(S-\Delta S)^2 \quad (2)$$

Here, “Ld” is the luminance value of a pixel circuit serving as a correction target. Moreover, “Ad” is a coefficient (conversion efficiency) determined based on conversion efficiency when converting a driving current supplied to the light-emitting device 640 of a pixel circuit serving as a correction target into a luminance. Furthermore, “ΔS” is the driving current amount decrease component D1 in FIG. 4. Furthermore, “$(S-\Delta S)^2$” represents a driving current supplied to the light-emitting device 640 when the driving current amount decrease component D1 is taken into consideration. As above, the deteriorated luminance value Ld can be calculated by the driving current $(S-\Delta S)^2$ in which the deteriorated conversion efficiency Ad and the driving current amount decrease component D1 are taken into consideration.

As described above, when a pixel circuit deteriorates with the use of the display device 100, deterioration of a conversion efficiency and decrease of a driving current progress at the same time, and a luminance value corresponding to the gradation value of a video signal decreases. In the following description, a phenomenon in which a conversion efficiency deteriorates with the elapse of the use time of a pixel circuit will be referred to as a conversion efficiency deterioration, and a phenomenon in which the driving current decreases with the elapse of the use time will be referred to as a current amount deterioration. In the pixel characteristic graph shown in FIG. 4, the conversion efficiency deterioration corresponds to a decrease in slope of the pixel characteristic curve, and the current amount deterioration corresponds to a shift in the gradation direction of the pixel characteristic curve.

The burn-in correction unit 200 of the display device 100 uses the pixel characteristic (initial) 710 in a correction reference state (for example, in the initial state where no deterioration occurs) as a reference and corrects an input gradation value so that the pixel characteristic (correction target) 720 of a deteriorated pixel circuit is identical to the reference (the pixel characteristic 710). Although details are described later, in the burn-in correction unit 200 prepares a conversion efficiency deterioration correction pattern for correcting a conversion efficiency deterioration and a current amount deterioration correction pattern for correcting a current amount deterioration and corrects the gradation value of a video signal of a deteriorated pixel circuit. As above, by classifying deterioration components into an efficiency deterioration and a current amount deterioration and correcting the deterioration components, it is possible to realize correction of higher accuracy.

Here, correction of a conversion efficiency deterioration component will be described. In correction of the conversion efficiency deterioration component, the gradation of a video signal is changed based on the following expression. A corrected gradation value Gout is calculated by the following equation based on Equations (1) and (2).

$$Gout=(\Delta A)^{-1/2}\times Gin \quad (3)$$

$$\Delta A=Ad/A \quad (4)$$

Here, “Gout” is a gradation value of a video signal, corrected by the burn-in correction unit 200. Moreover, “Gin” is a gradation value of a video signal before corrected by the burn-in correction unit 200. Furthermore, “ΔA” is the value (conversion efficiency deterioration value) of a fraction expressing the ratio of conversion efficiencies in which the conversion efficiency Ad of a correction target pixel circuit is the numerator and the conversion efficiency A of a pixel circuit in the initial state is the denominator. In addition, in Equations (3) and (4), the driving current decrease amount ΔS is not taken into consideration. In other words, "Gout" is a gradation value needed for a pixel circuit, in which the conversion efficiency value deteriorates to Ad, to obtain the luminance value L which is obtained when a gradation value Gin is input to the pixel circuit in the initial state when the driving current decrease amount ΔS is not taken into consideration.

In order to change the input gradation value based on Equation (3), the burn-in correction unit 200 holds information on deterioration of each of the pixel circuits 600 to 608 and calculates a conversion efficiency value of each of the pixel circuits 600 to 608 based on the deterioration information. Moreover, the burn-in correction unit 200 calculates ΔA and changes the gradation of a video signal based on the calculated ΔA to thereby generate the value (corrected gradation value) of the corrected gradation of the video signal. As above, correction based on the conversion efficiency deterioration value (ΔA) based on Equation (3) will be referred to as conversion efficiency deterioration correction. The conversion efficiency deterioration correction corresponds to correction of the slope of the pixel characteristic curve.

However, in the conversion efficiency deterioration correction, the effect of the driving current decrease amount ΔS is not taken into consideration. Thus, the burn-in correction unit 200 further performs correction taking the effect of ΔS into consideration. Here, "ΔS" corresponds to the driving current amount decrease component D1 in the example of the pixel characteristic shown in FIG. 4. Thus, the gradation value Gout after the current amount deterioration correction can be calculated by the following equation based on Equation (3).

$$Gout=(\Delta A)^{-1/2}\times Gin+\Delta S \quad (5)$$

That is, after correcting the slope of the pixel characteristic by the conversion efficiency deterioration correction, by shifting the corrected gradation value by ΔS, the pixel characteristic after correction is made identical to the pixel characteristic curve (initial) 710. Such correction based on the driving current decrease amount ΔS will be referred to current amount deterioration correction. The current amount deterioration correction corresponds to correction of the shift in gradation of the pixel characteristic.

Hereinafter, a configuration of the burn-in correction unit will be described in detail.

[Configuration Example of Burn-In Correction Unit]

Figure 5:
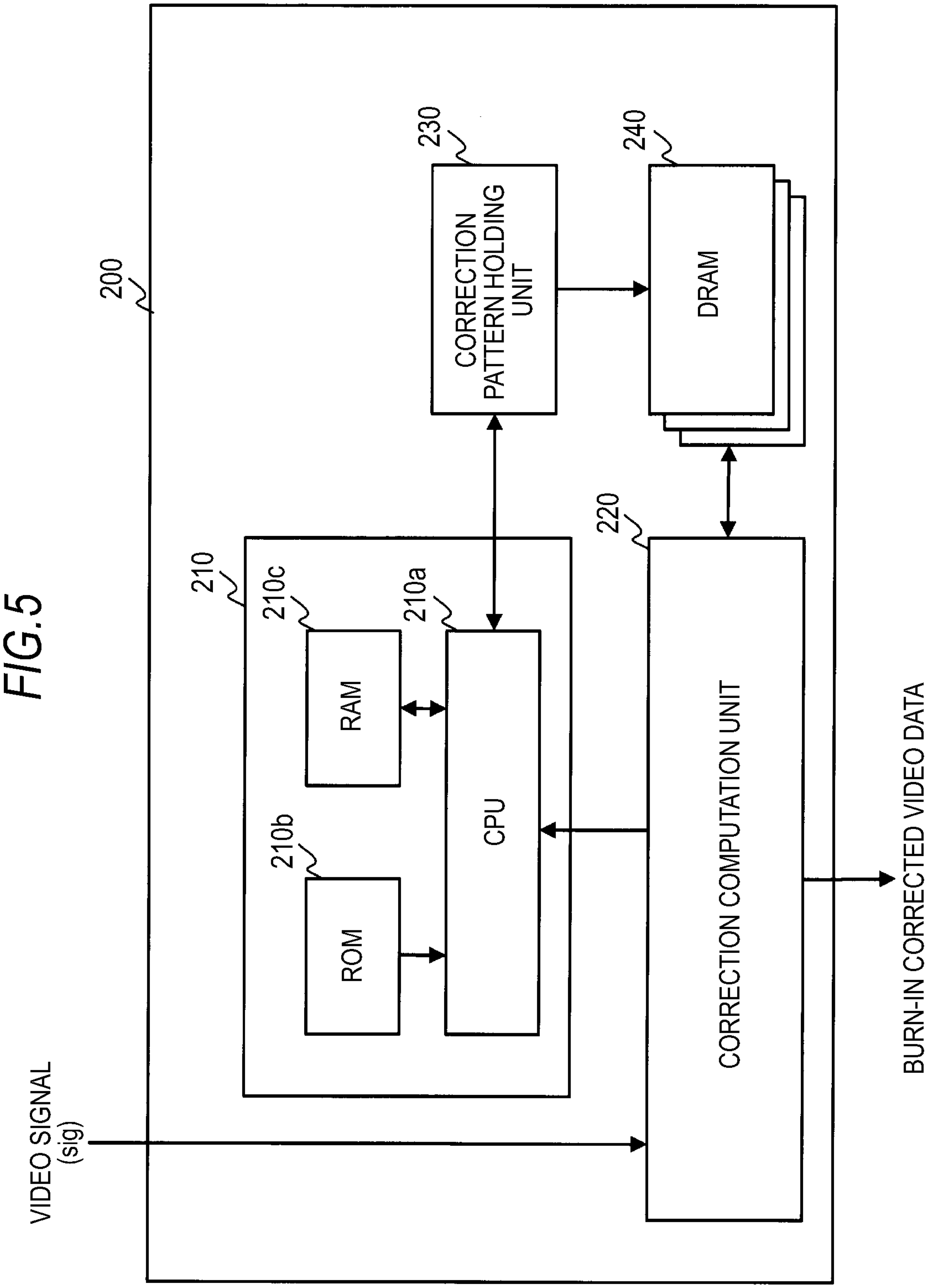
FIG. 5 is diagram showing an example of a hardware configuration of a burn-in correction unit.

First, a hardware configuration example of the burn-in correction unit 200 will be described. FIG. 5 is a diagram showing an example of a hardware configuration of the burn-in correction unit.

The burn-in correction unit 200 includes a correction pattern generation unit 210, a correction computation unit 220, a correction pattern holding unit 230, and a DRAM (Dynamic Random Access Memory) 240. The burn-in correction unit 200 corrects the gradation value of an input video signal and outputs the corrected video signal to the pixel array unit 500 as burn-in correction video data.

The correction pattern generation unit 210 performs a process of generating correction patterns for correcting conversion efficiency deterioration and current amount deterioration with the aid of a CPU (Central Processing Unit) 210*a*. The CPU 210*a* is connected through an internal bus to a ROM (Read Only Memory) 210*b*, a RAM (Random Access Memory) 210*c*, and peripheral devices such as the correction computation unit 220 and the correction pattern holding unit 230.

Various data necessary for processing by the CPU 210*a* are stored in the RAM 210*c*. OS programs, application programs, and various data are stored in the ROM 210*b*.

The correction computation unit 220 acquires the gradation value of a video signal and performs a burn-in correction process. The correction computation unit 220 is configured by an ASIC (Application Specific Integrated Circuit) or an FPGA (Field Programmable Gate Array) in order to perform processing at a high speed.

The correction pattern holding unit 230 is a storage unit that holds correction patterns generated by the correction pattern generation unit 210. For example, the correction pattern holding unit 230 is configured by a semiconductor storage device such as a flash memory.

The DRAM 240 is a storage unit that holds correction patterns which are referenced by the correction computation unit 220. For example, the DRAM 240 is configured by a memory capable of performing processing at a relatively high speed such as a DDR SDRAM (Double-Data-Rate Synchronous DRAM).

Figure 6:
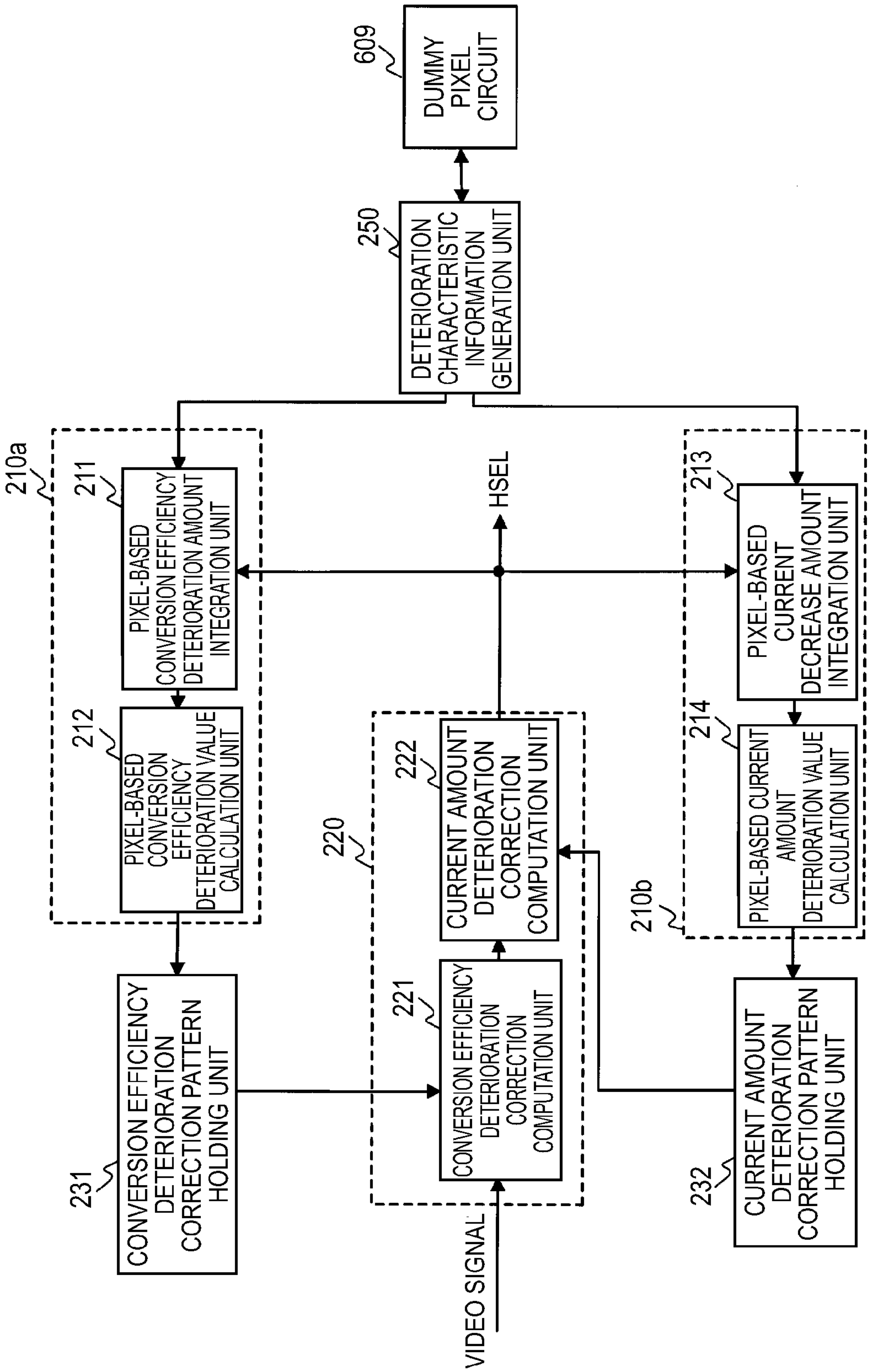
FIG. 6 is a diagram showing an example of a functional configuration of the burn-in correction unit.

Next, a functional configuration example of the burn-in correction unit 200 will be described. FIG. 6 is a diagram showing an example of a functional configuration of the burn-in correction unit.

The correction pattern generation unit 210, the correction computation unit 220, and the correction pattern holding unit 230 of the burn-in correction unit 200 shown in FIG. 5 each include a processing unit that performs conversion efficiency deterioration correction and a processing unit that performs current amount deterioration correction. The correction pattern generation unit 210 includes a conversion efficiency deterioration correction pattern generation unit 210*a* that generates a conversion efficiency deterioration correction pattern and a current amount deterioration correction pattern generation unit 210*b* that generates a current amount deterioration correction pattern. The correction computation unit 220 includes a conversion efficiency deterioration correction computation unit 221 that performs conversion efficiency deterioration correction and a current amount deterioration correction computation unit 222 that performs current amount deterioration correction. The correction pattern holding unit 230 includes a conversion efficiency deterioration correction pattern holding unit 231 that holds a conversion efficiency deterioration correction pattern and a current amount deterioration correction pattern holding unit 232 that holds a current amount deterioration correction pattern. In addition, the burn-in correction unit 200 includes a deterioration characteristic information generation unit 250 that detects a deterioration state of a pixel circuit.

Here, it is assumed that the burn-in correction unit 200 shown in FIG. 6 uses the pixel characteristic of a pixel circuit in the initial state where no deterioration occurs as a reference for correction and corrects a gradation value of an input video signal so that the pixel characteristic of each of deteriorated pixel circuits 600 to 608 is identical to the reference. Moreover, it is assumed that the burn-in correction unit 200 updates information held by a pixel-based conversion efficiency deterioration amount integration unit 211 and a pixel-based current decrease amount integration unit 213 by acquiring the gradation value of a corrected video signal of each frame every minute. Furthermore, it is assumed that whenever the information held in the pixel-based conversion efficiency deterioration amount integration unit 211 and the pixel-based current decrease amount integration unit 213 is updated, a pixel-based conversion efficiency deterioration value calculation unit 212 and a pixel-based current amount deterioration calculation unit 214 generate new correction patterns.

Hereinafter, the respective units of the conversion efficiency deterioration correction pattern generation unit 210*a* and a current amount deterioration correction pattern generation unit 210*b* will be described.

The conversion efficiency deterioration correction pattern generation unit 210*a* includes the pixel-based conversion efficiency deterioration amount integration unit 211 and the pixel-based conversion efficiency deterioration value calculation unit 212 and generates a conversion efficiency deterioration correction pattern. Here, the conversion efficiency deterioration correction pattern is a correction pattern including a correction value (conversion efficiency deterioration value) of the conversion efficiency deterioration for each of the pixel circuits 600 to 608 and is correction information for correcting the conversion efficiency deterioration.

The pixel-based conversion efficiency deterioration amount integration unit 211 holds information (conversion efficiency deterioration information) on deterioration of the conversion efficiencies of the pixel circuits 600 to 608 and sequentially updates the conversion efficiency deterioration information every prescribed update period. The conversion efficiency deterioration information is, for example, a value obtained by converting the amount of conversion efficiency deterioration of each of the pixel circuits 600 to 608 into an emission period at a specific gradation value. The converted value corresponds to an emission period required up to the occurrence of deterioration equivalent to the amount of conversion efficiency deterioration when a pixel is caused to emit light at a specific gradation value. The pixel-based conversion efficiency deterioration amount integration unit 211 calculates a new deterioration amount of the conversion efficiency of each of the pixel circuits 600 to 608 whenever the update period has been reached. The new deterioration amount means a deterioration amount occurring in each pixel circuit during the time between a previous update period and the present update period. For example, the new deterioration amount of the conversion efficiency of each of the pixel circuits 600 to 608 is calculated using an efficiency deterioration conversion coefficient based on a corrected video signal supplied from the correction computation unit 220. Here, the efficiency deterioration conversion coefficient is, for example, a coefficient for converting the deterioration amount of the light-emitting device 640 with the elapse of time based on an emission period and a gradation value set to a pixel circuit during emission. The efficiency deterioration conversion coefficient is calculated based on the deterioration characteristic information of the conversion efficiency generated by the deterioration characteristic information generation unit 250. In this way, the new deterioration amount is added to the conversion efficiency deterioration information, and the conversion efficiency deterioration information is updated. The updated conversion efficiency deterioration information is supplied to the pixel-based conversion efficiency deterioration value calculation unit 212. As above, the new deterioration amount of each of the pixel circuits 600 to 608 calculated whenever the update period has been reached is sequentially added to the conversion efficiency deterioration information to thereby calculate a total deterioration amount of the conversion efficiencies of the pixel circuits 600 to 608 up to when the update period has been reached.

The pixel-based conversion efficiency deterioration value calculation unit 212 generates a conversion efficiency deterioration correction pattern and supplies the conversion efficiency deterioration correction pattern to the conversion efficiency deterioration correction pattern holding unit 231. The pixel-based conversion efficiency deterioration value calculation unit 212 sequentially acquires the conversion efficiency deterioration information of the pixel circuits 600 to 608, calculates the conversion efficiency of the pixel circuit using coefficient conversion information, and uses the calculated conversion efficiency as a target conversion efficiency value. Here, when a value converted into an emission period corresponding to a video signal of a specific gradation value is the conversion efficiency deterioration information, the coefficient conversion information is, for example, information representing the correlation between the emission period and the conversion efficiency. Moreover, a conversion efficiency of a pixel circuit in a correction reference state (for example, the initial state where no deterioration occurs) is used as a reference conversion efficiency value. Moreover, the calculated target conversion efficiency value and the reference conversion efficiency value are applied to Equation (4) to thereby calculate the conversion efficiency deterioration value $\Delta A$. By the same procedure, the conversion efficiency deterioration value is calculated for all pixel circuits 600 to 608 to thereby generate conversion efficiency deterioration correction patterns.

The current amount deterioration correction pattern generation unit 210*b* includes the pixel-based current decrease amount integration unit 213 and the pixel-based current amount deterioration calculation unit 214, and generates a current amount deterioration correction pattern. Here, the current amount deterioration correction pattern is a correction pattern including a correction value (current amount deterioration value) of the driving current decrease amount for each of the pixel circuits 600 to 608 and is correction information for correcting current amount deterioration.

The pixel-based current decrease amount integration unit 213 holds information on decrease in current amount of the driving current of each of the pixel circuits 600 to 608 as current amount decrease information and integrates a new decrease amount of the driving current of each of the pixel circuits 600 to 608 into the current amount decrease information to thereby update the current amount decrease information. Here, the current amount decrease information is, for example, a value obtained by converting the decrease amount of the driving current of each of the pixel circuits 600 to 608 into an emission period corresponding to a video signal of a specific gradation value. The pixel-based current decrease amount integration unit 213 calculates a new decrease amount of the driving current of each of the pixel circuits 600 to 608 whenever the update period has been reached. For example, the pixel-based current decrease amount integration unit 213 calculates information on the new decrease amount of each of the pixel circuits 600 to 608 using decrease amount conversion coefficient based on the corrected video signal supplied from the correction computation unit 220. Here, the decrease amount conversion coefficient is, for example, a coefficient for converting the decrease amount of the driving current amount with the elapse of time based on an emission period and a gradation value during emission. The decrease amount conversion coefficient is calculated based on the deterioration characteristic information of the current amount generated by the deterioration characteristic information generation unit 250. Moreover, the new deterioration amount is sequentially added to the current amount decrease information to thereby update the current amount decrease information. The updated current amount decrease information is supplied to the pixel-based current amount deterioration calculation unit 214.

The pixel-based current amount deterioration calculation unit 214 generates a current amount deterioration correction pattern. The current amount deterioration correction pattern is correction information for correcting the current amount deterioration of a pixel circuit. The pixel-based current amount deterioration calculation unit 214 sequentially acquires the current amount decrease information of the pixel circuits 600 to 608. Moreover, the pixel-based current amount deterioration calculation unit 214 calculates the driving current decrease amount of the pixel circuit from the acquired current amount decrease information using decrease amount conversion information. The driving current decrease amount corresponds to ΔS in Equation (2). Here, when a value converted into an emission period at a specific gradation value is the current amount decrease information, the decrease amount conversion information is, for example, information representing the correlation between the emission period and the current amount decrease information. Moreover, the driving current decrease amount calculated for a target pixel circuit using the current amount decrease information is used as a target current amount decrease amount. Moreover, in order to generate a current amount deterioration correction pattern, a current amount deterioration value for each of the pixel circuits 600 to 608 is calculated based on the target current amount decrease amount. For example, when a driving current decrease amount is supplied as the target current amount decrease amount, the driving current decrease amount is supplied as a current amount deterioration value. Here, the current amount deterioration value is a value used for eliminating a difference in driving current decrease amount between a correction target pixel circuit and a correction reference pixel circuit, which occurs when the gradation value of a video signal supplied to a pixel circuit serving as a correction target of the driving current decrease amount is changed. By the same procedure, the current amount deterioration value is calculated for all pixel circuits 600 to 608 to thereby generate current amount deterioration correction patterns.

Next, the correction computation unit 220 will be described. The correction computation unit 220 corrects an input video signal and supplies the corrected video signal to the horizontal selector (HSEL) 420 through the signal line 209. Moreover, the corrected video signal is supplied to the pixel-based conversion efficiency deterioration amount integration unit 211 and the pixel-based current decrease amount integration unit 213. Here, the respective units of the correction computation unit 220 will be described.

The conversion efficiency deterioration correction computation unit 221 corrects a conversion efficiency deterioration by changing the gradation value of a video signal input through the signal line based on a conversion efficiency deterioration correction pattern supplied from the conversion efficiency deterioration correction pattern holding unit 231. Moreover, the conversion efficiency deterioration correction computation unit 221 supplies the corrected video signal to the current amount deterioration correction computation unit 222.

The current amount deterioration correction computation unit 222 corrects a driving current decrease amount by changing the gradation value of a video signal output from the conversion efficiency deterioration correction computation unit 221 based on a current amount deterioration correction pattern supplied from the current amount deterioration correction pattern holding unit 232. Moreover, the current amount deterioration correction computation unit 222 supplies the gradation value of the corrected video signal to the pixel-based conversion efficiency deterioration amount integration unit 211, the pixel-based current decrease amount integration unit 213, and the horizontal selector (HSEL) 420 through the signal line 209.

The correction pattern holding unit 230 will be described. The correction pattern holding unit 230 includes the conversion efficiency deterioration correction pattern holding unit 231 and the current amount deterioration correction pattern holding unit 232. The conversion efficiency deterioration correction pattern holding unit 231 holds conversion efficiency deterioration correction patterns including the conversion efficiency deterioration values of the respective pixel circuits, generated by the pixel-based conversion efficiency deterioration value calculation unit 212 and supplies the conversion efficiency deterioration correction patterns to the conversion efficiency deterioration correction computation unit 221. The current amount deterioration correction pattern holding unit 232 holds current amount deterioration correction patterns including current amount deterioration values of the respective pixel circuits, generated by the pixel-based current amount deterioration calculation unit 214 and supplies the current amount deterioration correction patterns to the current amount deterioration correction computation unit 222.

The deterioration characteristic information generation unit 250 drives a dummy pixel circuit 609 by setting a plurality of levels of input gradation values to the dummy pixel circuit 609 every update period and measures the luminance value of the dummy pixel circuit 609 at that time. Moreover, the deterioration characteristic information generation unit 250 updates the deterioration characteristic information on deterioration of a luminance value due to a decrease in the driving current based on the measurement results. In addition, the dummy pixel circuit 609 is a pixel circuit which is not included in a display screen although it is a pixel circuit included in the pixel array unit 500. By using the dummy pixel circuit 609, it is possible to perform a measurement process without affecting the display screen even when the display device 100 is under operation. Moreover, when performing inspection, adjustment, or the like before shipment, pixel circuits constituting the display screen may be used as target pixel circuits, and the characteristics for each pixel circuit may be acquired.

As above, by providing the conversion efficiency deterioration correction pattern generation unit 210*a* and the conversion efficiency deterioration correction computation unit 221, it is possible to correct the conversion efficiency deterioration of the pixel circuits 600 to 608. Moreover, by providing the current amount deterioration correction pattern generation unit 210*b* and the current amount deterioration correction computation unit 222, it is possible to perform correction on the decrease in the driving current of the pixel circuits 600 to 608. In this case, the efficiency deterioration conversion coefficient used for integration of the conversion efficiency deterioration amount and the decrease amount conversion coefficient used for integration of the current decrease amount are obtained by causing the dummy pixel circuit 609 to emit light at a plurality of levels of gradation values and measuring the deterioration of the dummy pixel circuit 609 due to the light emission. In this way, it is possible to perform a burn-in correction process with high accuracy taking the actual use state of the display device 100 into consideration.

In this example, although the video signal is acquired every one minute, and the information held in the pixel-based conversion efficiency deterioration amount integration unit 211 and the pixel-based current decrease amount integration unit 213 is updated, the present disclosure is not limited to this. The acquisition intervals of the video signal can be determined appropriately. For example, a corrected video signal may be acquired every ten minutes, and the conversion efficiency deterioration information may be updated assuming that light is emitted for ten minutes in accordance with the acquired video signal. By setting the update intervals of the conversion efficiency deterioration information to be relatively long, it is possible to further decrease the amount of computation. Moreover, by setting the acquisition intervals to be short, the information may be updated with higher accuracy. Furthermore, the update cycle of the correction patterns by the conversion efficiency deterioration correction pattern generation unit 210*a* and the current amount deterioration correction pattern generation unit 210*b* may not be the same as the update cycle of the information held in the pixel-based conversion efficiency deterioration amount integration unit 211 and the pixel-based current decrease amount integration unit 213. Even when the luminance fluctuates from one pixel circuit to another, since the deterioration of a pixel circuit progresses slowly, the conversion efficiency deterioration correction pattern and the current amount deterioration correction pattern are not abruptly updated to another pattern. Thus, for example, the amount of computation may be decreased by acquiring the conversion efficiency deterioration information and the current amount decrease information every one hour and updating the correction pattern every one hour based on the acquired information.

[Configuration Example of Deterioration Characteristic Information Generation Unit]

Figure 7:
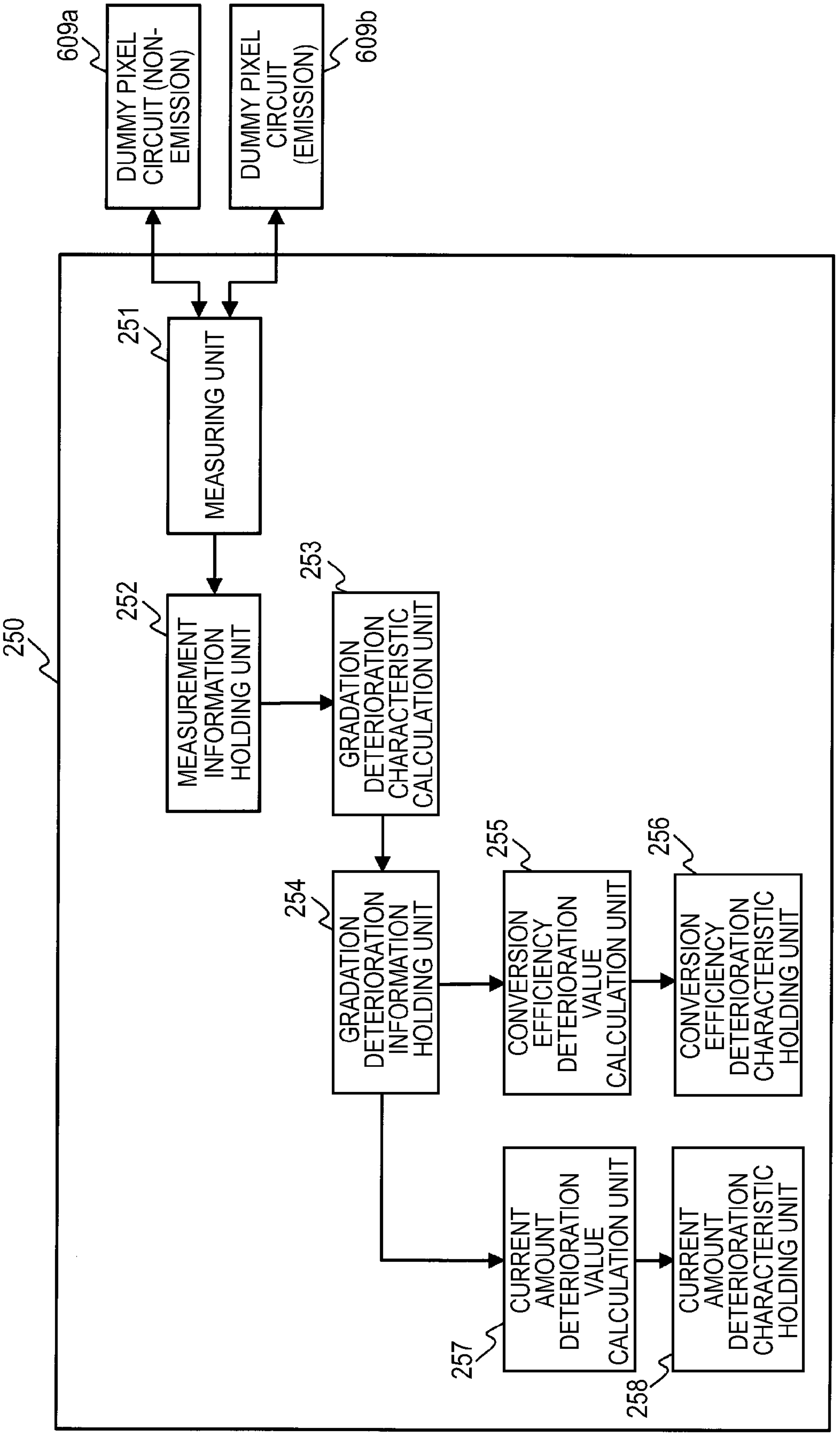
FIG. 7 is a diagram showing an example of a functional configuration of a deterioration characteristic information generation unit.

Next, a configuration example of the deterioration characteristic information generation unit 250 will be described. The deterioration characteristic information generation unit 250 calculates the deterioration characteristic of a pixel circuit using the dummy pixel circuit 609. FIG. 7 is a diagram showing an example of a functional configuration of the deterioration characteristic information generation unit.

The deterioration characteristic information generation unit 250 includes a measuring unit 251, a measurement information holding unit 252, a gradation deterioration characteristic calculation unit 253, a gradation deterioration information holding unit 254, a conversion efficiency deterioration value calculation unit 255, a conversion efficiency deterioration characteristic holding unit 256, a current amount deterioration value calculation unit 257, and a current amount deterioration characteristic holding unit 258.

In the configuration example of FIG. 7, the dummy pixel circuit 609 includes a dummy pixel circuit (non-emission) 609*a* and a dummy pixel circuit (emission) 609*b*. It is assumed that the dummy pixel circuit (non-emission) 609*a* and the dummy pixel circuit (emission) 609*b* have the same constituent elements and circuits which constitute the pixel circuits, and the characteristic on deterioration of the pixel circuits is the same. Here, the dummy pixel circuit (non-emission) 609*a* is driven in a non-emission state, excluding a period in which the luminance thereof is measured by the measuring unit 251. On the other hand, the dummy pixel circuit (emission) 609*b* is driven with a prescribed gradation value, excluding a period in which the luminance thereof is measured by the measuring unit 251. Thus, although the pixel characteristics of the dummy pixel circuit (non-emission) 609*a* and the dummy pixel circuit (emission) 609*b* are the same in the initial state, the progress state of deterioration becomes different with the elapse of time. The dummy pixel circuit (non-emission) 609*a* has a very small degree of deterioration resulting from the driving of a pixel circuit even when the time elapses, and the degree of deterioration can be considered to be the same as that of the dummy pixel circuit (emission) 609*b* in the initial state. In contrast, since the dummy pixel circuit (emission) 609*b* is driven with a prescribed gradation value, the deterioration thereof progresses with the elapse of time. Therefore, the measurement information of the dummy pixel circuit (non-emission) 609*a* can be considered to be the measurement information of the dummy pixel circuit (emission) 609*b* in the initial state. Thus, by comparing the measurement information of the dummy pixel circuit (emission) 609*b* with the measurement information of the dummy pixel circuit (non-emission) 609*a*, the deterioration amount from the initial state of the dummy pixel circuit (emission) 609*b* is calculated. As above, by comparing a non-emission pixel circuit and an emission pixel circuit under the same environment to thereby calculate the deterioration amount, it is not necessary to take the effect on deterioration values, of a change in temperature of a display unit or the like into consideration. Moreover, it is possible to calculate the deterioration values easily. In addition, since the period for the measurement by the measuring unit 251 is very short as compared to the entire driving period of the dummy pixel circuits 609*a* and 609*b*, the effect of the measurement on the deterioration of the dummy pixel circuits 609*a* and 609*b* is negligible.

Moreover, in the configuration example of FIG. 7, although the dummy pixel circuit (non-emission) 609*a* and the dummy pixel circuit (emission) 609*b* are provided, the dummy pixel circuit (non-emission) 609*a* may not be provided. In this case, the relationship between the gradation value and the luminance value in the initial state of a dummy pixel circuit is held in advance in the measurement information holding unit 252 so as to be used as the measurement values for the dummy pixel circuit (non-emission) 609*a*. In the following description, a case in which the dummy pixel circuit (non-emission) 609*a* is provided will be described.

When an update cycle has been reached, the measuring unit 251 sets a plurality of levels of gradation values to each of the dummy pixel circuit (non-emission) 609*a* and the dummy pixel circuit (emission) 609*b* and measures the luminance of a light-emitting device when each gradation value is set. Here, it is assumed that the gradation value set to the dummy pixel circuit (non-emission) 609*a* and the dummy pixel circuit (emission) 609*b* is a preset gradation value pattern regardless of the gradation value of a video signal. Moreover, the measuring unit 251 generates measurement information in which the measured luminance value is correlated with a gradation value and supplies the measurement information to the measurement information holding unit 252. The measurement information of the dummy pixel circuit (non-emission) 609*a* and the dummy pixel circuit (emission) 609*b* is supplied to the measurement information holding unit 252. Hereinafter, the measurement information of the dummy pixel circuit (non-emission) 609*a* will be referred to as measurement information (non-emission), and the measurement information of the dummy pixel circuit (emission) 609*b* will be referred to as measurement information (emission).

The measurement information holding unit 252 holds the measurement information (non-emission) of the dummy pixel circuit (non-emission) 609*a* and the measurement information (emission) of the dummy pixel circuit (emission) 609*b* supplied from the measuring unit 251. The held measurement information (non-emission) and measurement information (emission) are supplied to the gradation deterioration characteristic calculation unit 253.

The gradation deterioration characteristic calculation unit 253 acquires and compares the measurement information (emission) and the measurement information (non-emission) and generates gradation deterioration information in which the gradation value of the dummy pixel circuit (non-emission) 609*a* and the gradation value of the dummy pixel circuit (emission) 609*b* corresponding to the same luminance are correlated with each other. Due to deterioration of a pixel circuit, the luminance decreases even when the same gradation value as that of the initial state is set. Thus, a gradation value is calculated which is set to the dummy pixel circuit (non-emission) 609*a* in the initial state and which produces the same luminance as a luminance obtained when a certain gradation value is set to the dummy pixel circuit (emission) 609*b* where deterioration progresses. Since the calculated gradation value in the initial state is a gradation value obtained by converting an input gradation value set to a pixel circuit during measurement into a gradation value in the initial state, in the following description, the gradation value will be referred to as a conversion gradation value. As the driving period of a pixel circuit increases, the conversion efficiency deterioration and the current amount deterioration progress, and a conversion gradation value corresponding to an input gradation value set to the pixel circuit decreases. As above, characteristic indicating the deterioration state of a pixel circuit based on a gradation value will be referred to as gradation deterioration characteristic. For example, the gradation deterioration characteristic calculation unit 253 extracts a luminance corresponding to a certain gradation value set to the dummy pixel circuit (emission) 609*b* from the measurement information (emission) and calculates a gradation value of the dummy pixel circuit (non-emission) 609*a* corresponding to the luminance based on the measurement information (non-emission). The calculated gradation value of the dummy pixel circuit (non-emission) 609*a* is considered to be a conversion gradation value. In this way, the gradation deterioration characteristic calculation unit 253 generates the gradation deterioration information in which the gradation value of the dummy pixel circuit (emission) 609*b* and a conversion gradation value corresponding to a luminance at that time are correlated with each other. The generated gradation deterioration information is supplied to the gradation deterioration information holding unit 254.

The gradation deterioration information holding unit 254 holds the gradation deterioration information generated by the gradation deterioration characteristic calculation unit 253 and supplies the gradation deterioration information to the conversion efficiency deterioration value calculation unit 255 and the current amount deterioration value calculation unit 257.

Figure 8:
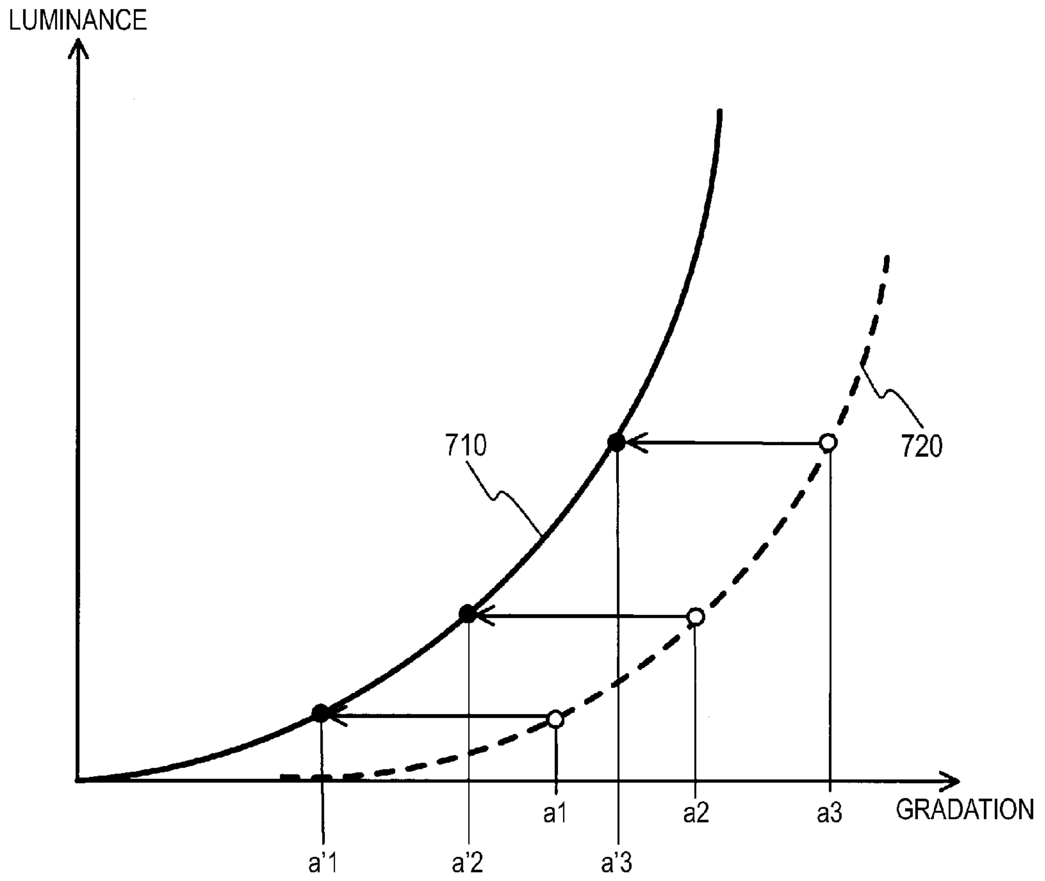
FIG. 8 is a graph showing an example of a process of calculating a gradation deterioration characteristic.

FIG. 8 is a graph showing an example of a process of calculating gradation deterioration characteristic. The vertical axis of FIG. 8 represents a measured luminance value, and the horizontal axis represents a gradation value set to a dummy pixel circuit.

A pixel characteristic curve (initial) 710 represents the relationship between the gradation value and luminance value measured for the dummy pixel circuit (non-emission) 609*a*. In the dummy pixel circuit (non-emission) 609*a*, the pixel circuit is considered to be equivalent to that in the initial state where no deterioration occurs. In addition, the pixel characteristic curve (initial) 710 may not use measurement values but may hold the initial value in the initial state of a pixel circuit in advance in the device. The pixel characteristic curve (initial) 710 can be expressed by Equation (1). In Equation (1), although the luminance value L is expressed by a conversion efficiency and a driving current, in this graph, the luminance value L is expressed using a gradation value instead of the driving current. Then, Equation (1) can be expressed as follows.

$$L = A \times (\text{Input Gradation Value})^{2.2} \quad (5)$$

Here, "L" and "A" are the same as those of Equation (1). Moreover, "2.2" is a value which is generally set as initial characteristic.

A pixel characteristic curve (deteriorated) 720 represents the relationship between the gradation value and luminance value measured for the dummy pixel circuit (emission) 609*b*. Since the dummy pixel circuit (emission) 609*b* is driven with a prescribed gradation value, deterioration occurs therein. Although the pixel characteristic curve (deteriorated) 720 is expressed by Equation (2), it can be expressed using a gradation value in a manner similarly to the above.

$$Ld = Ad \times ((\text{Input Gradation Value}) - \Delta\text{Gradation})^{2.2} \quad (6)$$

Here, "Ld" and "Ad" are the same as those of Equation (2). Moreover, "ΔGradation" is a decrease amount of gradation value corresponding to the decrease amount ΔS of driving current.

The gradation deterioration characteristic calculation unit 253 extracts the gradation values of the pixel characteristic curve (deteriorated) 720 and the pixel characteristic curve (initial) 710 corresponding to the same luminance and correlates the extracted gradation values with each other. For example, a luminance corresponding to a gradation value a1 of the dummy pixel circuit (emission) 609*b* is extracted based on the measurement information (emission). Moreover, a conversion gradation value a'1 of the dummy pixel circuit (non-emission) 609*a* corresponding to the luminance is calculated. For example, if a conversion efficiency A in the initial state is known, the conversion gradation value can be calculated by "(Conversion Gradation Value)=$(L/A)^{1/2.2}$" from Equation (5). In this way, conversion gradation values a'2 and a'3 of the dummy pixel circuit (non-emission) 609*a* corresponding to the same luminance as gradation values a2 and a3 of the dummy pixel circuit (emission) 609*b* are calculated. Moreover, the values a1, a2, and a3 are correlated with the values a'1, a'2, and a'3 to generate gradation deterioration information, and the gradation deterioration information is supplied to the gradation deterioration information holding unit 254. The gradation deterioration information holding unit 254 holds the acquired gradation deterioration information.

Next, description will be provided by returning to FIG. 7.

The conversion efficiency deterioration value calculation unit 255 calculates a conversion efficiency deterioration value of the dummy pixel circuit (emission) 609*b* based on the gradation deterioration information held by the gradation deterioration information holding unit 254. Moreover, the conversion efficiency deterioration characteristic information is updated in accordance with the calculated conversion efficiency deterioration value and the time elapsed from the initial state, of the measurement time for measuring the dummy pixel circuit (emission) 609*b*. The conversion efficiency deterioration information is information in which the degree of deterioration of the conversion efficiency from the initial state when the dummy pixel circuit (emission) 609*b* is driven with a prescribed gradation value is correlated with the time elapsed from the initial state.

The conversion efficiency deterioration characteristic holding unit 256 holds the conversion efficiency deterioration characteristic information which is appropriately updated by the conversion efficiency deterioration value calculation unit 255.

The current amount deterioration value calculation unit 257 calculates the current amount deterioration value of the dummy pixel circuit (emission) 609*b* based on the gradation deterioration information held by the gradation deterioration information holding unit 254. Moreover, the current amount deterioration characteristic information is updated in accordance with the calculated current amount deterioration value and the time elapsed from the initial state, of the measurement time for measuring the dummy pixel circuit (emission) 609*b*. The current amount deterioration characteristic information is information in which the degree of deterioration of the current amount of the driving current from the initial state when the dummy pixel circuit (emission) 609*b* is driven with a prescribed gradation value is correlated with the time elapsed from the initial state.

The current amount deterioration characteristic holding unit 258 holds the current amount deterioration characteristic information which is appropriately updated by the current amount deterioration value calculation unit 257.

Figures 9A, 9B:
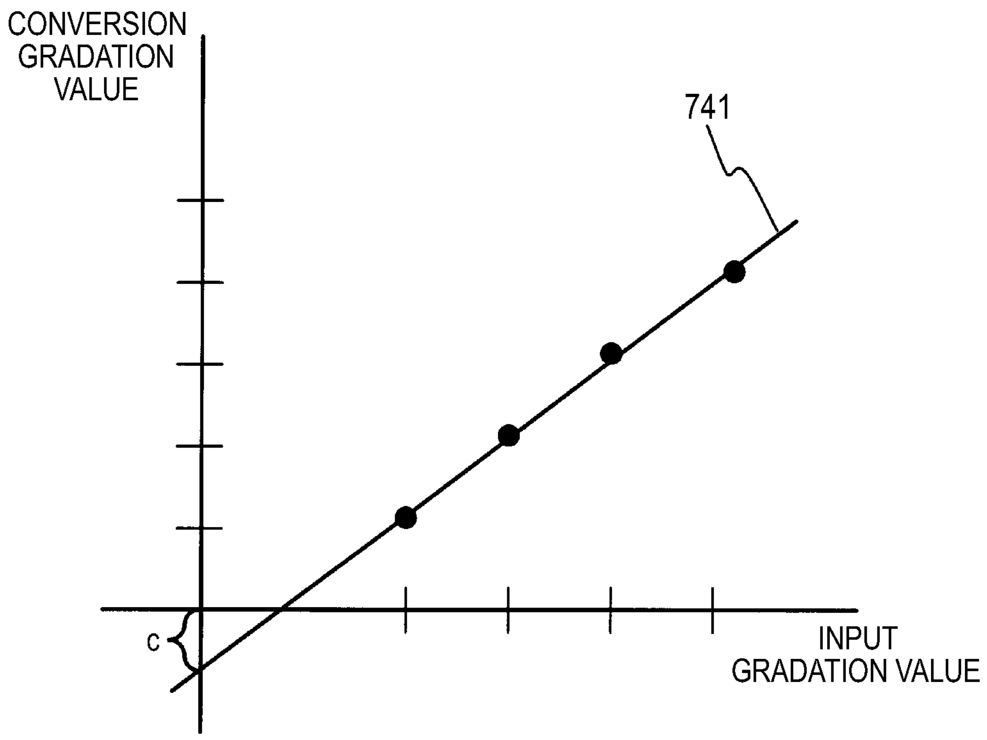
FIGS. 9A and 9B are diagrams showing an example of gradation deterioration information and the gradation deterioration characteristic line thereof.

Next, a process of calculating the conversion efficiency deterioration value and the current amount deterioration value will be described. FIGS. 9A and 9B are diagrams showing an example of gradation deterioration information and the gradation deterioration characteristic line thereof. FIG. 9A shows the gradation deterioration information, and FIG. 9B is a gradation deterioration characteristic graph.

Gradation deterioration information 740 shown in FIG. 9A is information in which the gradation value of the dummy pixel circuit (emission) 609*b* and the gradation value of the dummy pixel circuit (non-emission) 609*a*, producing the same luminance, calculated by the gradation deterioration characteristic calculation unit 253 by the above-described procedure are correlated with each other. In the gradation deterioration information 740, a gradation value set to the dummy pixel circuit (emission) 609*b* is an input gradation value, and the corresponding gradation value of the dummy pixel circuit (non-emission) 609*a* is a conversion gradation value. The gradation deterioration information 740 shows that a luminance obtained when an input gradation value of "1000" is set to the dummy pixel circuit (emission) 609*b* during measurement, for example is the same as a luminance obtained when a conversion gradation value of "820" is set when the dummy pixel circuit (emission) 609*b* is in the initial state. The same statement can be applied to other input gradation values.

The gradation deterioration characteristic graph shown in FIG. 9B is a graph obtained by plotting the input gradation value and the conversion gradation value shown in the gradation deterioration information in FIG. 9A. The horizontal axis represents an input gradation value, and the vertical axis represents a conversion gradation value. The relationship between the input gradation value and the conversion gradation value at that time can be approximated to a straight line. The straight line will be referred to as a gradation deterioration characteristic approximation straight line 741. In this example, the gradation deterioration characteristic approximation straight line 741 is assumed to be a straight line having a slope of b and an intercept of c.

Here, the meanings of the slope b and the intercept c of the gradation deterioration characteristic approximation straight line 741 in relation to the deterioration state of a pixel circuit will be described. The luminance of the dummy pixel circuit (emission) 609*b* when an input gradation value is set thereto can be expressed by "$\Delta d \times ((\text{Input Gradation Value}) - \Delta\text{Gradation})^{2.2}$" from Equation (6). On the other hand, the luminance of the dummy pixel circuit (non-emission) 609*a* when a conversion gradation value producing the same luminance as above is set thereto can be expressed by "$A \times (\text{Conversion Gradation Value})^{2.2}$" from Equation (5). Since the two luminance values are identical to each other, the following equation can be obtained.

$$\Delta d \times ((\text{Input Gradation Value}) - \Delta\text{Gradation})^{2.2} = A \times (\text{Conversion gradation value})^{2.2} \quad (7)$$

By arranging the above equation, the conversion gradation value can be expressed by the following equation.

$$\text{Conversion Gradation Value} = (Ad/A)^{1/2.2}((\text{Input Gradation Value}) - \Delta\text{Gradation}) \quad (8)$$

Here, the gradation deterioration characteristic approximation straight line 741 shown in FIG. 9B can be expressed as follows.

$$\text{Conversion Gradation Value} = b \times (\text{Input Gradation Value}) - c \quad (9)$$

From Equations (8) and (9), "Ad/A" and "ΔGradation" can be expressed as follows using b and c. In the following description, "Ad/A" will be referred to as "ΔSlope".

$$\Delta\text{Slope} = Ad/A = b^{2.2}$$

$$\Delta\text{Gradation} = c/b \quad (10)$$

As shown in Equation (4), "ΔSlope" corresponds to the conversion efficiency deterioration value. Moreover, as shown in Equation (6), "ΔGradation" corresponds to the current amount deterioration value. In this way, the deterioration characteristic information generation unit 250 can calculate the conversion efficiency deterioration value and the current amount deterioration value based on the gradation deterioration information and the gradation deterioration characteristic shown in FIGS. 9A and 9B. As above, since the deterioration characteristic information generation unit 250 calculates the conversion efficiency deterioration value and the current amount deterioration value based on the luminance actually measured using the dummy pixel circuit (non-emission) 609*a* and the dummy pixel circuit (emission) 609*b*, it is possible to obtain highly accurate values. In addition, even when the dummy pixel circuit (non-emission) 609*a* is not used, the conversion efficiency deterioration value and the current amount deterioration value can be calculated based on the actual measurement values for the dummy pixel circuit (emission) 609*b*.

Hereinafter, a generation example of the conversion efficiency deterioration characteristic and the current amount deterioration characteristic in the burn-in correction unit 200 having the above configuration will be described.

[Generation Example of Gradation Deterioration Information]

Figure 10:
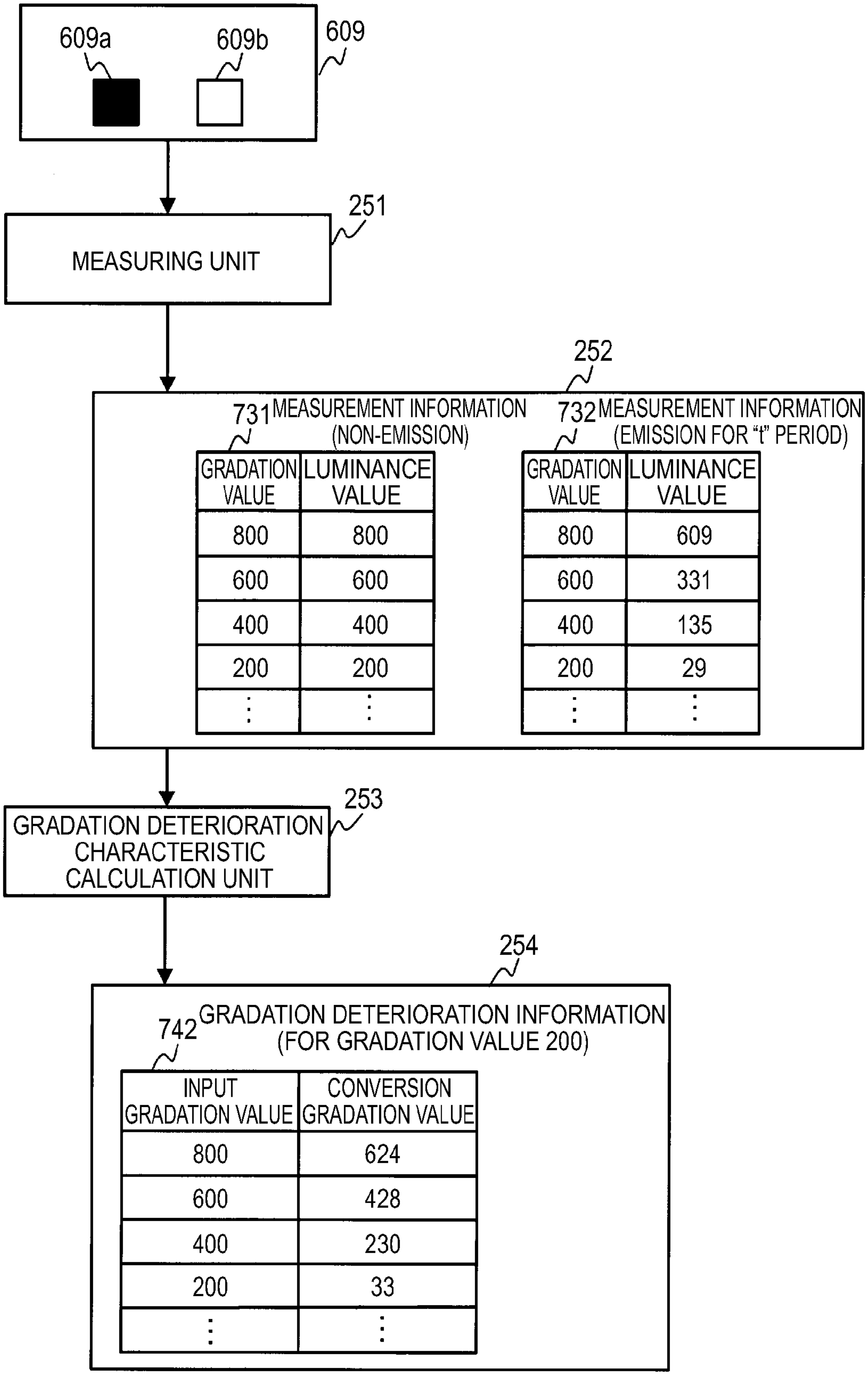
FIG. 10 is a diagram showing a generation example of gradation deterioration information.

FIG. 10 is a diagram showing a generation example of gradation deterioration information. FIG. 10 schematically illustrates the flow up to when the gradation deterioration information (for the gradation value 200) 742 held by the gradation deterioration information holding unit 254 is generated based on the measurement value measured by the measuring unit 251. In this example, a case where the measurement is performed using two dummy pixel circuits of the dummy pixel circuit (non-emission) 609*a* and the dummy pixel circuit (emission) 609*b* is described.

The measuring unit 251 sets a plurality of levels of gradation values to each of the dummy pixel circuit (non-emission) 609*a* and the dummy pixel circuit (emission) 609*b* at a prescribed update cycle and measures the luminance at that time. The time elapsed from the initial state during measurement will be referred to as a period t. The measured luminance value is registered in measurement information so as to be correlated with the gradation value and supplied to the measurement information holding unit 252. In this way, the measurement information holding unit 252 holds measurement information (non-emission) 731 measured for the dummy pixel circuit (non-emission) 609*a* and measurement information (for "t" emission period) 732 measured for the dummy pixel circuit (emission) 609*b*. Since the dummy pixel circuit (non-emission) 609*a* maintains the non-emission state, deterioration caused by light emission does not occur in the pixel circuit, and the dummy pixel circuit (non-emission) 609*a* can be considered to be in the initial state. In the example of the measurement information (non-emission) 731, it is possible to obtain measurement information where no luminance deterioration occurs in such a manner that luminance values of "800" "600", "400," and "200" are obtained with respect to gradation values of "800" "600", "400," and "200," respectively. In contrast, in the dummy pixel circuit (emission) 609*b* in which light is continuously emitted at a prescribed luminance (in the example, a gradation value of "200") for the "t" period, deterioration caused by light emission occurs. In the example of the measurement information (for "t" emission period) 732, luminance deterioration occurs in such a manner that luminance values "609", "331", "135," and "29" are obtained with respect to gradation values of "800" "600", "400," and "200," respectively. In addition, when the dummy pixel circuit (non-emission) 609*a* is not provided, measurement information in the initial state is registered in advance in the measurement information (non-emission) 731.

The gradation deterioration characteristic calculation unit 253 reads the measurement information (non-emission) 731 and the measurement information (for "t" emission period) 732 held by the measurement information holding unit 252 and calculates a conversion gradation value of the dummy pixel circuit (non-emission) 609*a* producing the same luminance as the input gradation value of the dummy pixel circuit (emission) 609*b*. For example, the luminance value of "609" corresponding to the input gradation value of "800" is extracted from the measurement information (for "t" emission period) 732. Moreover, a conversion gradation value producing the luminance value of "609" is calculated based on the measurement information (non-emission) 731. The conversion gradation value is calculated by assuming that the gradation value and the luminance value of the dummy pixel circuit (non-emission) 609*a* have the relationship of Equation (5), for example. In the example of FIG. 10, a conversion gradation value of "624" is calculated with respect to the input gradation value of "800". Similarly, the same computation is performed with respect to the input gradation values of "600", "400", and "200" to thereby calculate the conversion gradation values of "428", "230", and "33", respectively. The input gradation value and the calculated conversion gradation value are correlated with each other to generate the gradation deterioration information (for the gradation value 200) 742, and the gradation deterioration information (for the gradation value 200) 742 is supplied to the gradation deterioration information holding unit 254. The gradation deterioration information holding unit 254 holds the gradation deterioration information (for the gradation value 200) 742 and supplies the same to the conversion efficiency deterioration value calculation unit 255 and the current amount deterioration value calculation unit 257.

In the above description, although the dummy pixel circuit (emission) 609*b* is driven with the gradation value of "200", the gradation value is not limited to this. Moreover, if necessary, a plurality of dummy pixel circuits (emission) may be prepared, and the same measurement information may be obtained with respect to a plurality of gradation values.

[Generation Example of Conversion Efficiency Deterioration Characteristic and Current Amount Deterioration Characteristic]

Figure 11:
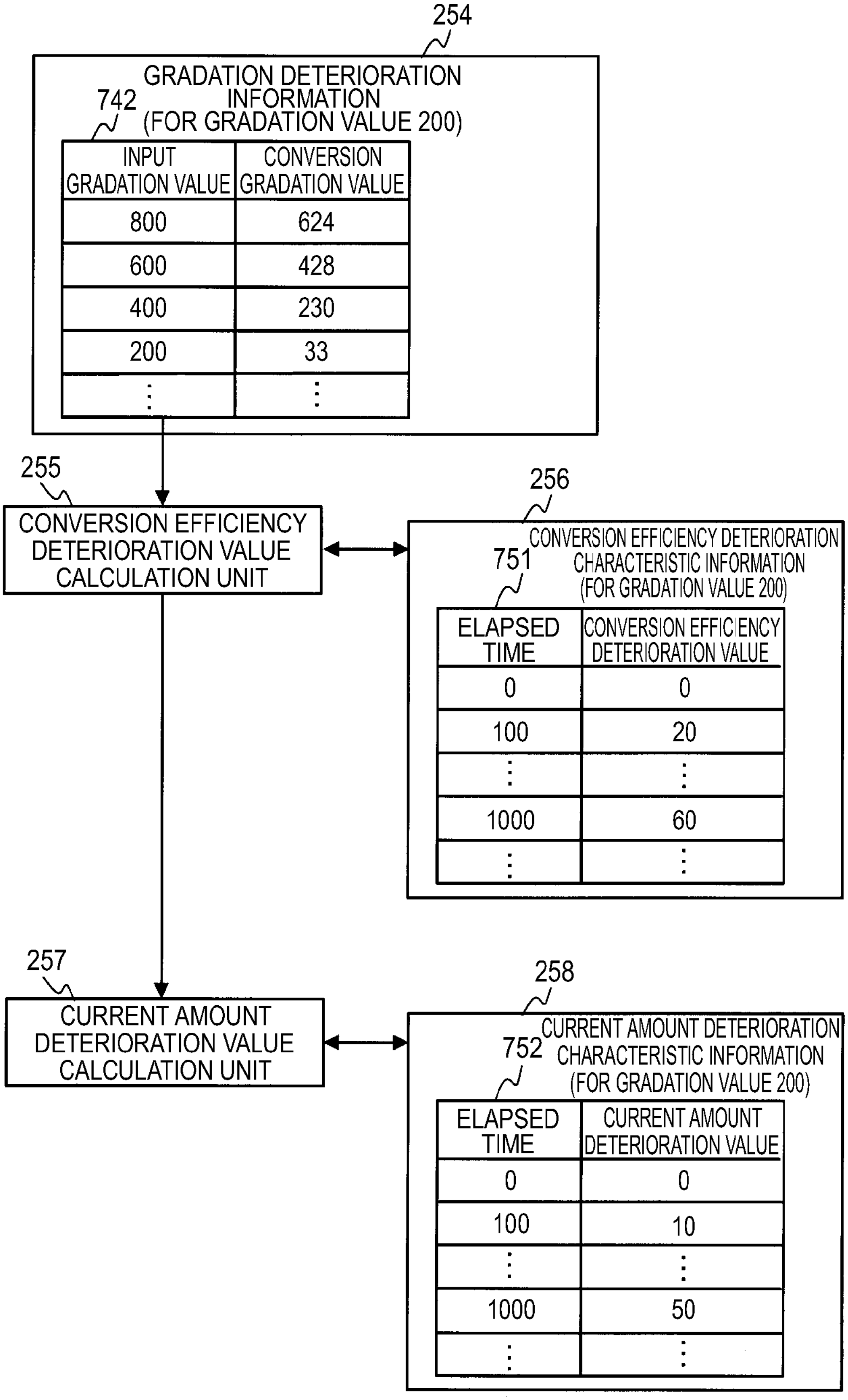
FIG. 11 is a diagram showing a generation example of conversion efficiency deterioration characteristic information and current amount deterioration characteristic information.

FIG. 11 is a diagram showing a generation example of conversion efficiency deterioration characteristic information and current amount deterioration characteristic information. FIG. 11 schematically illustrates the flow up to when conversion efficiency deterioration characteristic information (for the gradation value 200) 751 and current amount deterioration characteristic information (for the gradation value 200) 752 are generated based on the gradation deterioration information (for the gradation value 200) 742 held by the gradation deterioration information holding unit 254.

The gradation deterioration information holding unit 254 holds the gradation deterioration information (for the gradation value 200) 742 generated by the gradation deterioration characteristic calculation unit 253 by the process shown in FIG. 10.

The conversion efficiency deterioration value calculation unit 255 calculates a conversion efficiency deterioration value using the gradation deterioration information (for the gradation value 200) 742 held by the gradation deterioration information holding unit 254. For example, the slope of an approximation straight line when a gradation deterioration characteristic is approximated to a straight line is calculated based on the correlation between the input gradation value and the conversion gradation value in the gradation deterioration information (for the gradation value 200) 742. For example, a variation of an input gradation value from a plurality of input gradation values and a variation of a conversion gradation value corresponding to the input gradation value are calculated, and the proportion of the variation of the conversion gradation value to the variation of the input gradation value to thereby calculate the slope of an approximation straight line of the gradation deterioration characteristic. Moreover, the ΔSlope (the conversion efficiency deterioration value) is calculated from the slope of the approximation straight line of the gradation deterioration characteristic using Equation (10). The conversion efficiency deterioration characteristic information (for the gradation value 200) 751 held by the conversion efficiency deterioration characteristic holding unit 256 is updated based on the calculated conversion efficiency deterioration value and the elapsed time (in this example, the "t" period). The conversion efficiency deterioration characteristic information (for the gradation value 200) 751 in which the elapsed time from the initial state and an estimated conversion efficiency deterioration value at that time when a pixel circuit is driven with a prescribed gradation value (in the example of FIG. 11, "200") is held in advance in the conversion efficiency deterioration characteristic holding unit 256 as a master curve of the conversion efficiency deterioration. In addition, the estimated conversion efficiency deterioration value may be measurement data measured in advance using a prescribed pixel circuit. The conversion efficiency deterioration value calculation unit 255 corrects the master curve set in the conversion efficiency deterioration characteristic information (for the gradation value 200) 751 using the calculated conversion efficiency deterioration value and updates the conversion efficiency deterioration value corresponding to the elapsed time.

The current amount deterioration value calculation unit 257 calculates the conversion efficiency deterioration value using the gradation deterioration information (for the gradation value 200) 742 held by the gradation deterioration information holding unit 254. For example, the intercept of an approximation straight line when the gradation deterioration characteristic is approximated to a straight line is calculated based on the correlation between the input gradation value and the conversion gradation value in the gradation deterioration information (for the gradation value 200) 742. For example, the value of the intercept is calculated from the slope of the approximation straight line calculated by the conversion efficiency deterioration value calculation unit 255 and the value of the gradation deterioration information (for the gradation value 200) 742. Moreover, the ΔGradation (the current amount deterioration value) is calculated from the slope of the approximation straight line and the value of the intercept using Equation (10). The current amount deterioration characteristic information (for the gradation value 200) 752 held by the current amount deterioration characteristic holding unit 258 is updated based on the calculated current amount deterioration value and the elapsed time (in this example, the "t" period). The current amount deterioration characteristic information (for the gradation value 200) 752 in which the elapsed time from the initial state and an estimated current amount deterioration value at that time when a pixel circuit is driven with a prescribed gradation value (in the example of FIG. 11, "200") is held in advance in the current amount deterioration characteristic holding unit 258 as a master curve of the current amount deterioration. In addition, the estimated current amount deterioration value may be measurement data measured in advance using a prescribed pixel circuit. The current amount deterioration value calculation unit 257 corrects the master curve set in the current amount deterioration characteristic information (for the gradation value 200) 752 using the calculated current amount deterioration value and updates the current amount deterioration value corresponding to the elapsed time.

In this way, the master curve of the conversion efficiency deterioration which represents the conversion efficiency deterioration characteristic information (for the gradation value 200) 751 held by the conversion efficiency deterioration characteristic holding unit 256 is corrected based on the actual measurement value. Similarly, the master curve of the current amount deterioration which represents the current amount deterioration characteristic information (for the gradation value 200) 752 held by the current amount deterioration characteristic holding unit 258 is corrected based on the actual measurement value. As above, since the master curve of the conversion efficiency deterioration and the master curve of the current amount deterioration are updated based on the actual measurement values for the deterioration state measured every update cycles, the burn-in correction unit 200 can hold highly accurate master curves. In addition, by performing burn-in correction using the highly accurate master curves, it is possible to perform burn-in correction with higher accuracy.

Figure 12A:
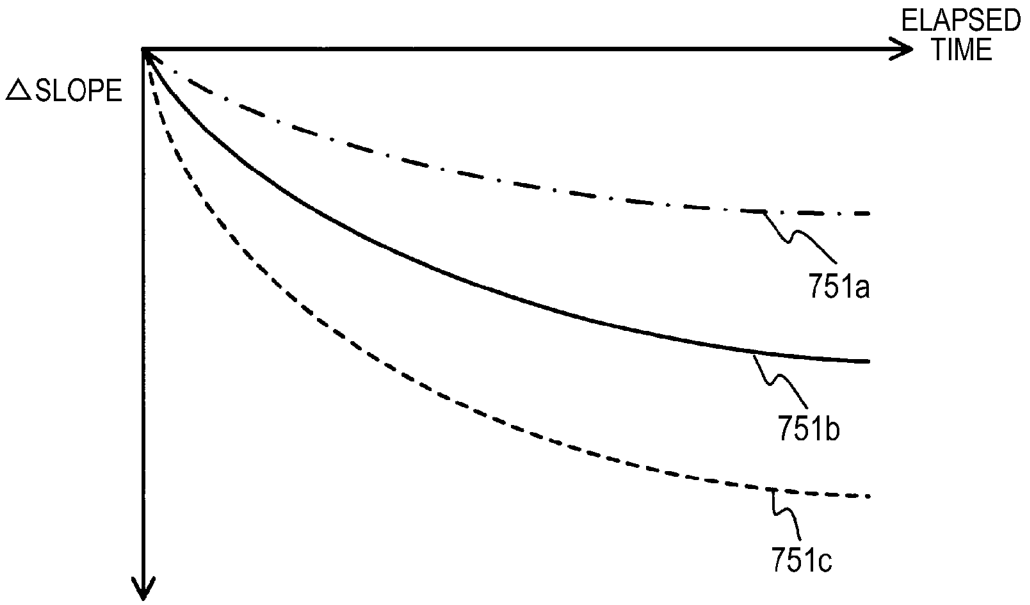
FIGS. 12A and 12B are graphs showing an example of a conversion efficiency deterioration curve and a current amount deterioration curve.
Figure 12B:
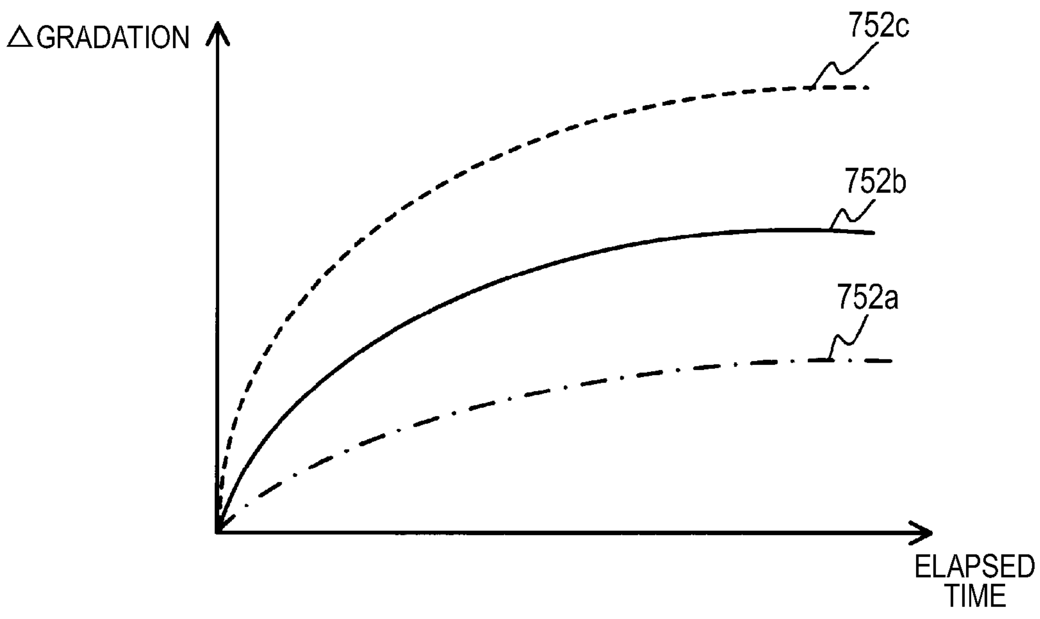

The master curve (conversion efficiency deterioration curve) of the conversion efficiency deterioration and the master curve (current amount deterioration curve) of the current amount deterioration updated by the above processing procedure will be described. FIGS. 12A and 12B are graphs showing an example of a conversion efficiency deterioration curve and a current amount deterioration curve. FIG. 12A shows an example of the conversion efficiency deterioration curve, and FIG. 12B shows an example of the current amount deterioration curve.

The example of the conversion efficiency deterioration curve in FIG. 12A shows the degree of deterioration of the conversion efficiency corresponding to the elapsed time for each gradation value. In FIG. 12A, the horizontal axis represents the elapsed time from the initial state, and the vertical axis represents the ΔSlope. A conversion efficiency deterioration curve (for the gradation value 100) 751*a* shows the relationship between the elapsed time and the ΔSlope (the conversion efficiency deterioration value) when a pixel circuit is driven with a gradation value of 100. A conversion efficiency deterioration curve (for the gradation value 200) 751*b* shows the relationship between the elapsed time and the ΔSlope (the conversion efficiency deterioration value) when a pixel circuit is driven with a gradation value of 200. A conversion efficiency deterioration curve (for the gradation value 400) 751*c* shows the relationship between the elapsed time and the ΔSlope (the conversion efficiency deterioration value) when a pixel circuit is driven with a gradation value of 400.

In addition, the conversion efficiency deterioration curve (for the gradation value 100) 751*a*, the conversion efficiency deterioration curve (for the gradation value 200) 751*b*, and the conversion efficiency deterioration curve (for the gradation value 400) 751*c* have correlation. For example, the time required for the conversion efficiency deterioration value at "gradation value 200" to deteriorate by a prescribed proportion (for example, 10 percents) has proportional relationship with the time required for 10 percents of the conversion efficiency deterioration value at "gradation value 100" to deteriorate similarly by the prescribed proportion. Thus, by holding the conversion efficiency deterioration characteristic information of one gradation value as a master curve, it is possible to calculate the conversion efficiency deterioration values at other gradation values. For example, by holding the conversion efficiency deterioration curve (for the gradation value 200) 751*b* in the conversion efficiency deterioration characteristic holding unit 256, it is possible to calculate conversion efficiency deterioration values of the conversion efficiency deterioration curves at other gradation values.

The example of the current amount deterioration curve in FIG. 12B shows the degree of deterioration of the driving current amount corresponding to the elapsed time for each gradation value. In FIG. 12B, the horizontal axis represents the elapsed time from the initial state, and the vertical axis represents the ΔGradation. A current amount deterioration curve (for the gradation value 100) 752*a* shows the relationship between the elapsed time and the ΔGradation corresponding to the current amount deterioration value when a pixel circuit is driven with the gradation value of 100. A current amount deterioration curve (for the gradation value 200) 752*b* shows the relationship between the elapsed time and the ΔGradation corresponding to the current amount deterioration value when a pixel circuit is driven with the gradation value of 200. A current amount deterioration curve (for the gradation value 400) 752*c* shows the relationship between the elapsed time and the ΔGradation corresponding to the current amount deterioration value when a pixel circuit is driven with the gradation value of 400.

In addition, the current amount deterioration curve (for the gradation value 100) 752*a*, the current amount deterioration curve (for the gradation value 200) 752*b*, and the current amount deterioration curve (for the gradation value 400) 752*c* have correlation. Similarly to the case of the conversion efficiency deterioration curve, by holding the current amount deterioration characteristic information of one gradation value as a master curve, it is possible to calculate the current amount deterioration values at other gradation values. For example, by holding the current amount deterioration curve (for the gradation value 200) 752*b* as a master curve, it is possible to calculate current amount deterioration values of the current amount deterioration curve at other gradation values based on the proportional relationship between gradation values.

[Generation Example of Conversion Efficiency Deterioration Correction Pattern]

Figure 13:
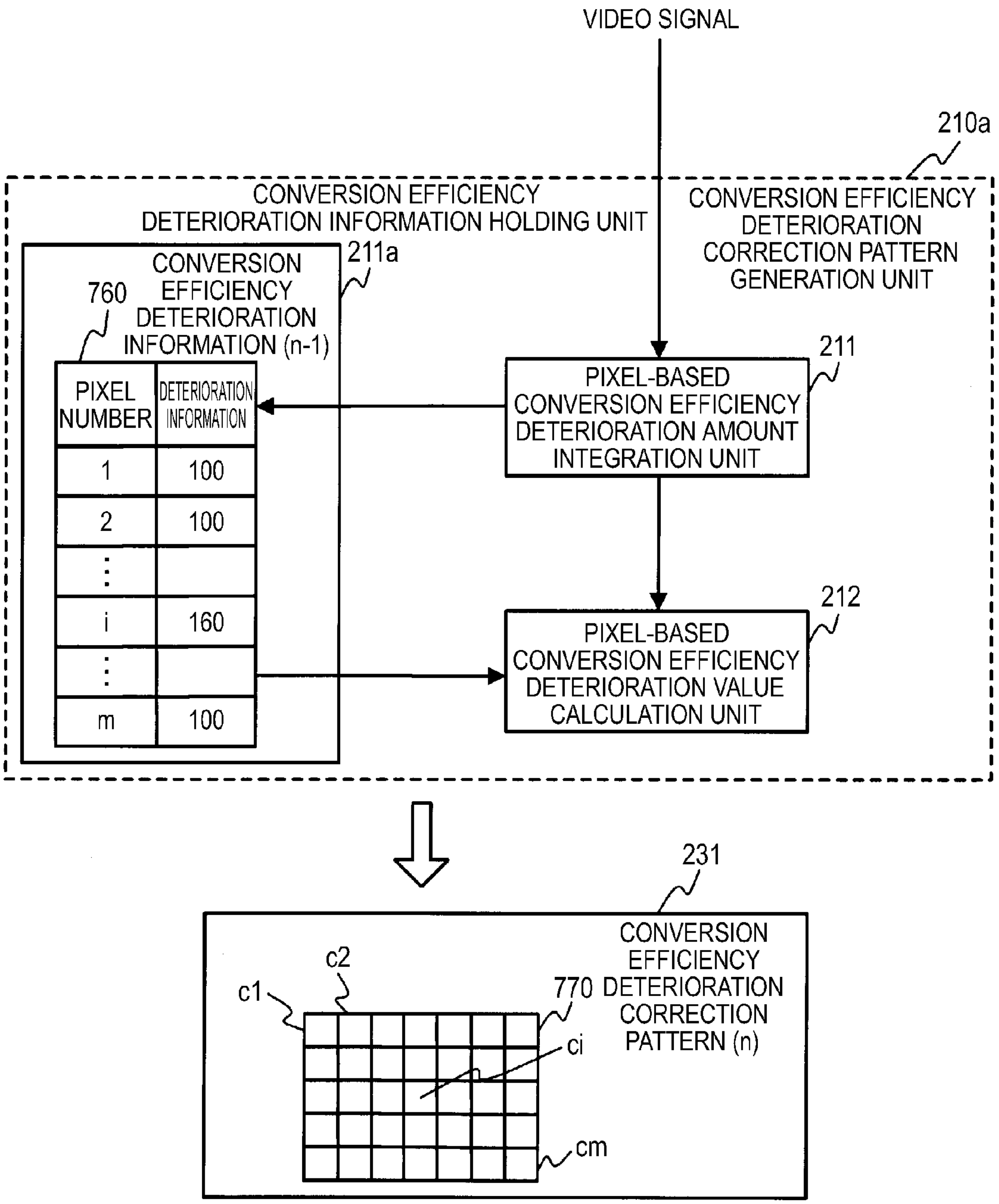
FIG. 13 is a diagram showing a generation example of a conversion efficiency deterioration correction pattern.

FIG. 13 is a diagram showing a generation of a conversion efficiency deterioration correction pattern. FIG. 13 schematically illustrates the flow up to when a conversion efficiency deterioration correction pattern (n) 770 held by the conversion efficiency deterioration correction pattern holding unit 231 is generated based on conversion efficiency deterioration information (n−1) 760 held by a conversion efficiency deterioration information holding unit 211*a*. Moreover, in FIG. 13, a storage unit that holds the conversion efficiency deterioration information in addition to the pixel-based conversion efficiency deterioration amount integration unit 211 and the pixel-based conversion efficiency deterioration value calculation unit 212 shown in FIG. 6 is described as the conversion efficiency deterioration information holding unit 211*a*. In addition, for the sake of convenience, pixel circuits provided in the display device 100 are identified by 1 to m. Here, the conversion efficiency deterioration correction pattern can be generated at the same cycle as, or a longer cycle than, the processing cycle at which the correction computation unit 220 processes a video signal. This is because deterioration progresses slowly even when the luminance fluctuates from one pixel circuit to another. For example, the amount of computation by the burn-in correction unit 200 can be decreased by updating the conversion efficiency deterioration correction pattern every one hour. However, in the following description, a case in which the conversion efficiency deterioration correction pattern is updated whenever the gradation value of a corrected video signal is output to a pixel circuit will be described.

The pixel-based conversion efficiency deterioration amount integration unit 211 updates conversion efficiency deterioration information (n−1) 760 held in the conversion efficiency deterioration information holding unit 211*a* by adding, to the same, a new deterioration amount of the conversion efficiency of each of the pixel circuits 1 to m. Here, the conversion efficiency deterioration information (n−1) 760 is, for example, a value obtained by converting the amount of the conversion efficiency deterioration of each of the pixel circuits 1 to m into an emission period at a specific gradation value. For example, the pixel-based conversion efficiency deterioration amount integration unit 211 calculates new information on deterioration of the conversion efficiency of each of the pixel circuits 1 to m using an efficiency deterioration conversion coefficient based on the gradation value of a corrected video signal supplied from the correction computation unit 220. Here, the efficiency deterioration conversion coefficient is a coefficient for calculating the deterioration amount of the conversion efficiency of the light-emitting device 640 with the elapse of time based on an emission period and the gradation during emission. The efficiency deterioration conversion coefficient is calculated based on the conversion efficiency (for the gradation value 200) 751 generated by the deterioration characteristic information generation unit 250 before the deterioration amount of the conversion efficiency is calculated.

The conversion efficiency deterioration information holding unit 211*a* holds, for each pixel circuit, the conversion efficiency deterioration information on deterioration of the luminance conversion efficiency of each of the pixel circuits 1 to m, supplied by the pixel-based conversion efficiency deterioration amount integration unit 211. The conversion efficiency deterioration information (n−1) 760 is held in the conversion efficiency deterioration information holding unit 211*a* as the conversion efficiency deterioration information based on the display during the (n−1)-th update cycle (where n is an integer of 2 or more). The conversion efficiency deterioration information (n−1) 760 is used for generating a conversion efficiency deterioration correction pattern (n) 770 for correcting the display during the n-th update cycle. A pixel number which is the number of a pixel circuit is held in the left column of the conversion efficiency deterioration information (n−1) 760, and the conversion efficiency deterioration information (the deterioration information) of the pixel circuit is held in the right column. For example, in this example, the conversion efficiency deterioration value is a value converted into the emission period (elapsed time) with the gradation value 200. For example, a period of "160" is held as the conversion efficiency deterioration information corresponding to the pixel number "i", and a period of "100" is held as the conversion efficiency deterioration information corresponding to the pixels numbers "1", "2", and "m".

In a state where such conversion efficiency deterioration information (n−1) 760 is held in the conversion efficiency deterioration information holding unit 211*a*, the pixel-based conversion efficiency deterioration value calculation unit 212 updates the n-th conversion efficiency deterioration correction pattern. First, the conversion efficiency deterioration information (n−1) 760 of a pixel circuit serving as a correction target is acquired, and the conversion efficiency of the pixel circuit is calculated and used as a target conversion efficiency value. For example, the process in which the target conversion efficiency value for the pixel number "1" is supplied to the pixel-based conversion efficiency deterioration value calculation unit 212 will be described. First, the pixel-based conversion efficiency deterioration value calculation unit 212 acquires the deterioration information "100" for the pixel number "1" from the conversion efficiency deterioration information (n−1) 760 and calculates the conversion efficiency using the coefficient conversion information. It is assumed that the coefficient conversion information is held in advance. Moreover, the pixel-based conversion efficiency deterioration value calculation unit 212 calculates the conversion efficiency deterioration value of the pixel circuit from the calculated conversion efficiency of the pixel circuit of the pixel number "1" and a reference efficiency deterioration value serving as a reference of correction and supplies the calculated conversion efficiency deterioration value to the conversion efficiency deterioration correction pattern holding unit 231. In this way, a conversion efficiency deterioration value corresponding to a conversion efficiency deterioration value "c1" of the conversion efficiency deterioration correction pattern (n) is held in the conversion efficiency deterioration correction pattern holding unit 231.

Next, the conversion efficiency deterioration correction pattern (n) 770 held in the conversion efficiency deterioration correction pattern holding unit 231 in this way will be described.

The conversion efficiency deterioration correction pattern (n) 770 schematically shows a conversion efficiency deterioration correction pattern generated by the pixel-based conversion efficiency deterioration value calculation unit 212. FIG. 13 schematically shows an example of a conversion efficiency deterioration pattern when a conversion efficiency deterioration value for each pixel circuit, generated by the pixel-based conversion efficiency deterioration value calculation unit 212 is arranged so as to correspond to an arrangement of pixels constituting a display screen. Specifically, the conversion efficiency deterioration correction pattern (n) 770 is an example of a correction pattern including the conversion efficiency deterioration values generated based on the conversion efficiency deterioration information (n−1) 760 and is a correction pattern for correcting the gradation value of a video signal of each frame displayed during the n-th update cycle (1 minute).

The conversion efficiency deterioration value c1 in the conversion efficiency deterioration correction pattern (n) 770 is a conversion efficiency deterioration value for correcting a pixel circuit corresponding to a pixel number shown in the conversion efficiency deterioration information (n−1) 760. Moreover, similarly to the conversion efficiency deterioration value c1, the conversion efficiency deterioration values c2, ci, and cm are conversion efficiency deterioration values for correcting the gradation value of a video signal supplied to the pixel circuits corresponding to the pixel numbers "2", "i", and "m" shown in the conversion efficiency deterioration information (n−1) 760.

In the correction computation unit 220, the conversion efficiency deterioration correction computation unit 221 corrects the gradation value of a video signal based on the conversion efficiency deterioration correction pattern (n) 770. For example, it is assumed that the conversion efficiency deterioration value ci of a pixel circuit corresponding to the pixel number "i" is larger than the conversion efficiency deterioration values c1, c2, and cm of pixel circuits corresponding to the other pixels numbers "1", "2", and "m". In this case, the conversion efficiency deterioration correction computation unit 221 sets the correction amount (increment) of the gradation value of a video signal of a pixel circuit corresponding to the pixel number "i" so as to be larger than the correction amount (increment) of the gradation value of a video signal of pixel circuits corresponding to the other pixel numbers "1", "2", and "m". By correcting the gradation value in this way, it is possible to correct burn-in.

As described above, the conversion efficiency deterioration correction pattern generation unit 210*a* generates a conversion efficiency deterioration correction pattern for changing the gradation value of a video signal displayed by a pixel circuit in accordance with the magnitude of a conversion efficiency deterioration value for each pixel circuit. Since the conversion efficiency deterioration values for all pixel circuits are set in the conversion efficiency deterioration correction pattern, it is possible to appropriately correct burn-in occurring in respective pixels which constitute a display screen.

[Generation Example of Current Amount Deterioration Correction Pattern]

Figure 14:
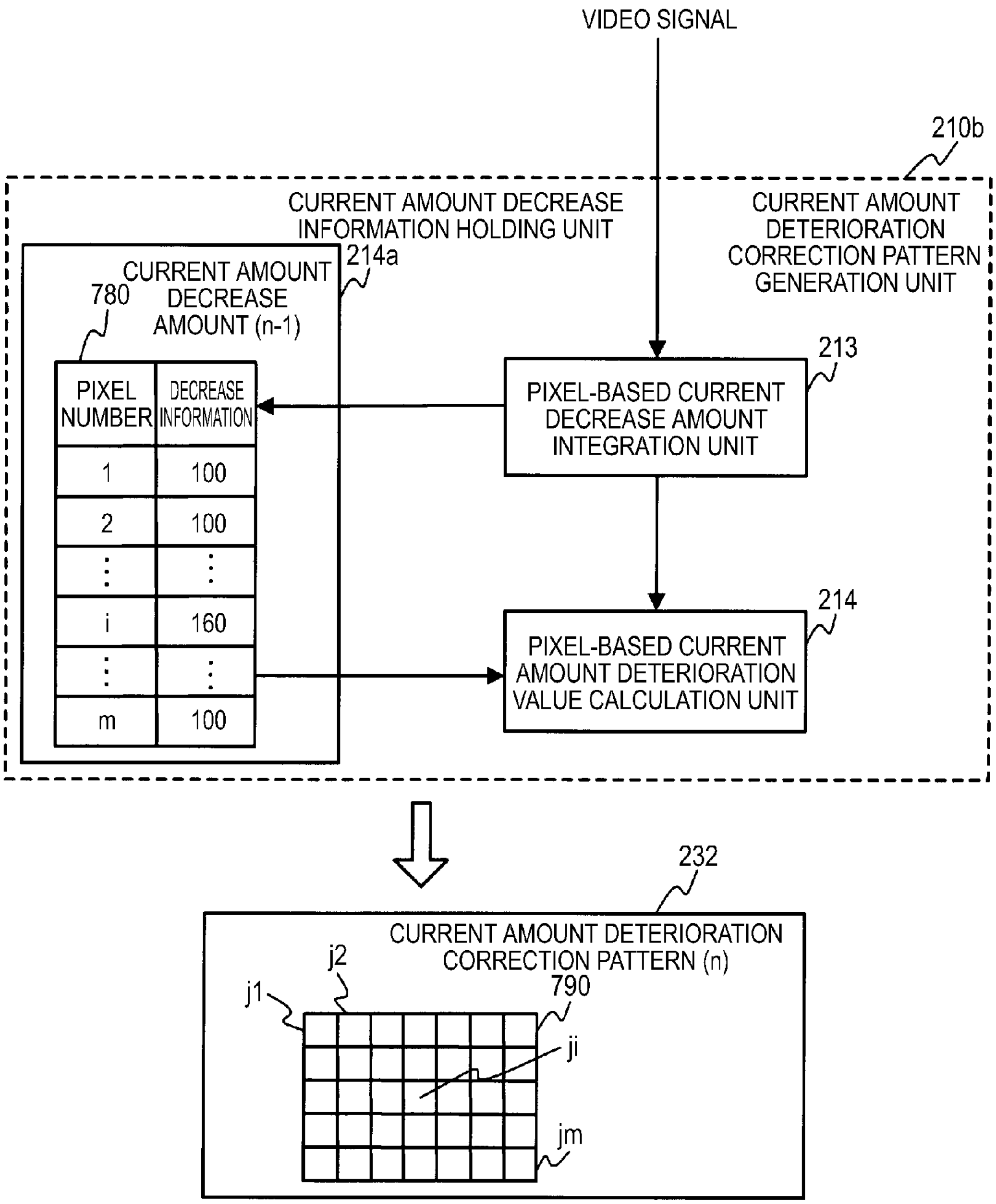
FIG. 14 is a diagram showing a generation example of a current amount deterioration correction pattern.

Next, a generation example of a current amount deterioration correction pattern by the current amount deterioration correction pattern generation unit 210*b* will be described. FIG. 14 is a diagram showing a generation example of a current amount deterioration correction pattern. FIG. 14 schematically shows the flow up to when a current amount deterioration correction pattern (n) 790 held by the current amount deterioration correction pattern holding unit 232 is generated based on current amount decrease information (n−1) 780 held by a current amount decrease information holding unit 214*a*. Moreover, in FIG. 14, a storage unit that holds the current amount decrease information in addition to the pixel-based current decrease amount integration unit 213 and the pixel-based current amount deterioration calculation unit 214 shown in FIG. 6 is described as the current amount decrease information holding unit 214*a*. In this example, similarly to the conversion efficiency deterioration correction pattern generation unit 210*a* shown in FIG. 13, pixel circuits provided in the display device 100 are identified by 1 to m. Moreover, a case in which the current amount deterioration correction pattern is updated whenever the gradation value of a corrected video signal is output to the pixel circuit will be described.

The current amount decrease information (n−1) 780 is information representing the decrease amount of a driving current of each pixel circuit, held in the current amount decrease information holding unit 214*a*. FIG. 14 shows an example of current amount decrease information held in the current amount decrease information holding unit 214*a* based on the display during the (n−1)-th update cycle as the current amount decrease information. The current amount decrease information (n−1) 780 is used for generating a current amount decrease correction pattern (n) for correcting the display during the n-th update cycle. A pixel number which is the number of a pixel circuit is held in the left column of the current amount decrease information (n−1) 780, and the current amount decrease information of the pixel circuit is held in the right column.

The pixel-based current decrease amount integration unit 213 updates the driving current decrease amount of each pixel circuit by adding a new driving current decrease amount of each of the pixel circuits 1 to m to the current amount decrease information (n−1) 780 held in the current amount decrease information holding unit 214*a*. Here, the current amount decrease information (n−1) 780 is, for example, a value obtained by converting the driving current decrease amount of each of the pixel circuits 1 to m into an emission period at a specific gradation value. For example, the pixel-based current amount deterioration calculation unit 214 calculates new information on the decrease amount of the driving current of each of the pixel circuits 1 to m using a decrease amount conversion coefficient based on the gradation value of a corrected video signal supplied from the correction computation unit 220. Here, the decrease amount conversion coefficient is a coefficient for calculating the decrease amount of the driving current of the light-emitting device 640 with the elapse of time based on an emission period and the gradation value set during emission. The decrease amount conversion coefficient can be calculated based on the current amount deterioration characteristic information (for the gradation value 200) 752 generated by the deterioration characteristic information generation unit 250. In the current amount deterioration characteristic information (for the gradation value 200) 752, the current amount deterioration value corresponding to the elapsed time when a pixel circuit is driven with the gradation value of 200 is registered as a master curve. Based on the master curve, a driving current decrease amount corresponding to an emission period of a target pixel circuit and the gradation value during emission is calculated.

The current amount decrease information holding unit 214*a* holds, for each pixel circuit, the current amount decrease information on the driving current decrease amount of each of the pixel circuits 1 to m, supplied by the pixel-based current decrease amount integration unit 213. The current amount decrease information (n−1) 780 is held in the current amount decrease information holding unit 214*a* based on the display during the (n−1)-th update cycle.

In a state where such current amount decrease information (n−1) 780 is held in the current amount decrease information holding unit 214*a*, the pixel-based current amount deterioration calculation unit 214 updates the n-th current amount deterioration correction pattern. First, the current amount decrease information of a pixel circuit serving as a correction target is acquired, and the new decrease amount of the driving current of the pixel circuit is calculated and used as a target current amount decrease amount. For example, the process in which the target current amount decrease amount for the pixel number "1" is supplied to the pixel-based current amount deterioration calculation unit 214 will be described. First, the pixel-based current amount deterioration calculation unit 214 acquires decrease information "100" for the pixel number "1" from the current amount decrease information (n−1) 780 and calculates a current decrease amount using the coefficient conversion information. It is assumed that the coefficient conversion information is held in advance. Moreover, the pixel-based current amount deterioration calculation unit 214 calculates the current amount deterioration value of the pixel circuit from the calculated current decrease value of the pixel circuit of the pixel number "1" and a reference current decrease value serving as a reference of correction and supplies the calculated current amount deterioration value to the current amount deterioration correction pattern holding unit 232. In this way, a current amount deterioration value corresponding to a current amount deterioration value "j1" of the current amount deterioration correction pattern (n) 790 is held in the current amount deterioration correction pattern holding unit 232.

Next, the current amount deterioration correction pattern (n) 790 held in the current amount deterioration correction pattern holding unit 232 in this way will be described.

The current amount deterioration correction pattern (n) 790 schematically shows a current amount deterioration correction pattern generated by the pixel-based current amount deterioration calculation unit 214. FIG. 14 schematically shows an example of a current amount deterioration correction pattern when a current amount deterioration value for each pixel circuit, generated by the pixel-based current amount deterioration calculation unit 214 is arranged so as to correspond to an arrangement of pixels constituting a display screen. Specifically, the current amount deterioration correction pattern (n) 790 is an example of a correction pattern including the current amount deterioration values generated based on the current amount decrease information (n−1) 780 and is a correction pattern for correcting the gradation value of a video signal of each frame displayed during the n-th processing period.

The current amount deterioration value j1 in the current amount deterioration correction pattern (n) 790 is a current amount deterioration value for correcting a pixel circuit corresponding to the pixel number "1" shown in the current amount decrease information (n−1) 780. Moreover, similarly to the current amount deterioration value j1, the current amount deterioration values j2, ji, and jm are current amount deterioration values for correcting the gradation value of a video signal supplied to the pixel circuits corresponding to the pixel numbers "2", "i", and "m" shown in the current amount decrease information (n−1) 780.

In the correction computation unit 220, the current amount deterioration correction computation unit 222 corrects the gradation value of a video signal based on the current amount deterioration correction pattern (n) 790. For example, it is assumed that the current amount deterioration value ji of a pixel circuit corresponding to the pixel number "i" is larger than the current amount deterioration values j1, j2, and jm of pixel circuits corresponding to the other pixel numbers "1", "2", and "m". In this case, the current amount deterioration correction computation unit 222 sets the correction amount (increment) of the gradation value of a video signal of a pixel circuit corresponding to the pixel number "i" so as to be larger than the correction amount (increment) of the gradation value of a video signal of pixel circuits corresponding to the other pixel numbers "1", "2", and "m". By correcting the gradation value in this way, it is possible to correct burn-in.

As described above, the current amount deterioration correction pattern generation unit 210*b* generates a current amount deterioration correction pattern for changing the gradation value of a video signal displayed by a pixel circuit in accordance with the magnitude of a driving current decrease amount for each pixel circuit. Since the current amount deterioration values for all pixel circuits are set in the current amount deterioration correction pattern, it is possible to appropriately correct burn-in occurring in respective pixels which constitute a display screen.

[Operation Example of Burn-In Correction Unit]

Figure 15:
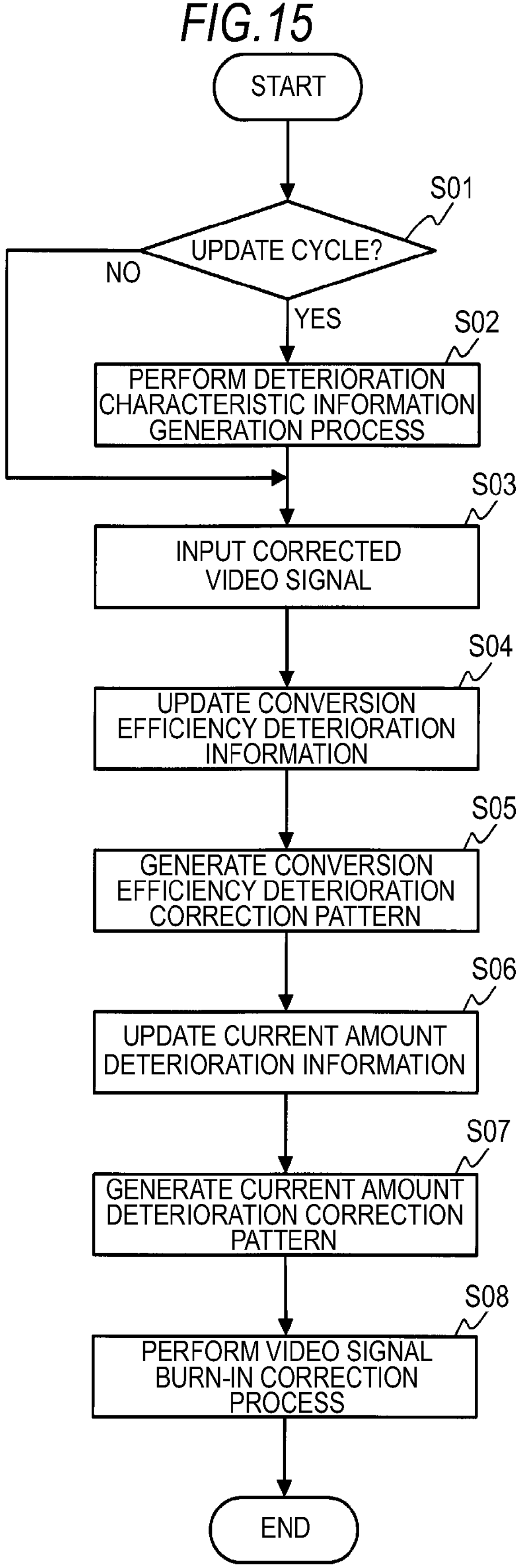
FIG. 15 is a flowchart showing an example of the procedure of a burn-in correction process by the burn-in correction unit.

Next, the operation of the burn-in correction unit 200 will be described with reference to drawings. FIG. 15 is a flowchart showing an example of the procedure of a burn-in correction process by the burn-in correction unit. In the example of FIG. 15, it is assumed that the correction pattern generation process is performed at the same cycle as a video signal processing cycle. Moreover, it is assumed that a deterioration characteristic information generation process is performed at an update cycle which is an integer multiple of the video signal processing cycle.

The burn-in correction unit 200 is activated at the video signal processing cycle.

[Step S01]

The deterioration characteristic information generation unit 250 determines whether a deterioration characteristic information update cycle has been reached. When the update cycle has been reached, the process proceeds to step S02. When the update cycle has not been reached, the process proceeds to step S03.

[Step S02]

When the deterioration characteristic information update cycle has been reached, the deterioration characteristic information generation unit 250 generates the deterioration characteristic information of the dummy pixel circuit 609 using the dummy pixel circuit 609. The deterioration characteristic includes conversion efficiency deterioration in converting a driving current to a luminance and current amount deterioration associated with the decrease in the driving current. The deterioration characteristic information generation unit 250 calculates a deterioration value of each of the conversion efficiency deterioration information on the conversion efficiency deterioration and the current amount deterioration characteristic information on the current amount deterioration. Details of the process will be described later.

[Step S03]

The conversion efficiency deterioration correction pattern generation unit 210*a* and the current amount deterioration correction pattern generation unit 210*b* acquire the gradation value of a corrected video signal output from the correction computation unit 220 at the previous video signal processing cycle and start respective processes.

[Step S04]

The pixel-based conversion efficiency deterioration amount integration unit 211 of the conversion efficiency deterioration correction pattern generation unit 210*a* calculates a new deterioration amount of the conversion efficiency using the gradation value of the corrected video signal and updates the conversion efficiency deterioration information. For example, a new conversion efficiency deterioration amount of a pixel circuit during the elapsed time from the previous processing cycle and the present processing cycle is calculated using the gradation value of the corrected video signal and the efficiency deterioration conversion coefficient. Here, the efficiency deterioration conversion coefficient is calculated in advance based on the conversion efficiency deterioration characteristic information generated by the deterioration characteristic information generation unit 250. Moreover, the calculated new conversion efficiency deterioration amount is added to the conversion efficiency deterioration information of the target pixel circuit to thereby update the conversion efficiency deterioration information.

[Step S05]

The pixel-based conversion efficiency deterioration value calculation unit 212 of the conversion efficiency deterioration correction pattern generation unit 210*a* generates a conversion efficiency deterioration correction pattern of each pixel based on the conversion efficiency deterioration information updated by the pixel-based conversion efficiency deterioration amount integration unit 211 and stores the conversion efficiency deterioration correction pattern in the conversion efficiency deterioration correction pattern holding unit 231.

[Step S06]

The pixel-based current decrease amount integration unit 213 of the current amount deterioration correction pattern generation unit 210*b* calculates a new decrease amount of the driving current using the gradation value of the corrected video signal to thereby update the current amount decrease information. For example, a new driving circuit decrease amount of a pixel circuit during the elapsed time from the previous processing cycle and the present processing cycle is calculated using the gradation value of the corrected video signal and the decrease amount conversion coefficient. Here, the decrease amount conversion coefficient is calculated in advance based on the current amount deterioration characteristic information generated by the deterioration characteristic information generation unit 250. Moreover, the calculated new driving current decrease amount is added to the current amount decrease information of the target pixel circuit to thereby update the current amount decrease information.

[Step S07]

The pixel-based current amount deterioration calculation unit 214 of the current amount deterioration correction pattern generation unit 210*b* generates a current amount deterioration correction pattern of each pixel based on the current amount decrease information updated by the pixel-based current decrease amount integration unit 213 and stores the current amount deterioration correction pattern in the current amount deterioration correction pattern holding unit 232.

[Step S08]

In the correction computation unit 220, the conversion efficiency deterioration correction computation unit 221 corrects the gradation value of an input video signal using the conversion efficiency deterioration correction pattern. Moreover, the current amount deterioration correction computation unit 222 corrects the corrected gradation value of the video signal using the current amount deterioration correction pattern.

By executing the above processing procedure, the conversion efficiency deterioration correction pattern and the current amount deterioration correction pattern are generated for the respective pixel circuits, and the conversion efficiency deterioration correction and the current amount deterioration correction are performed on the pixel circuits. In the above flowchart, although the current amount deterioration correction pattern generation unit 210*b* performs processing subsequently to the processing by the conversion efficiency deterioration correction pattern generation unit 210*a*, both processes may be performed in parallel.

[Operation Example of Deterioration Characteristic Information Generation Unit]

Figure 16:
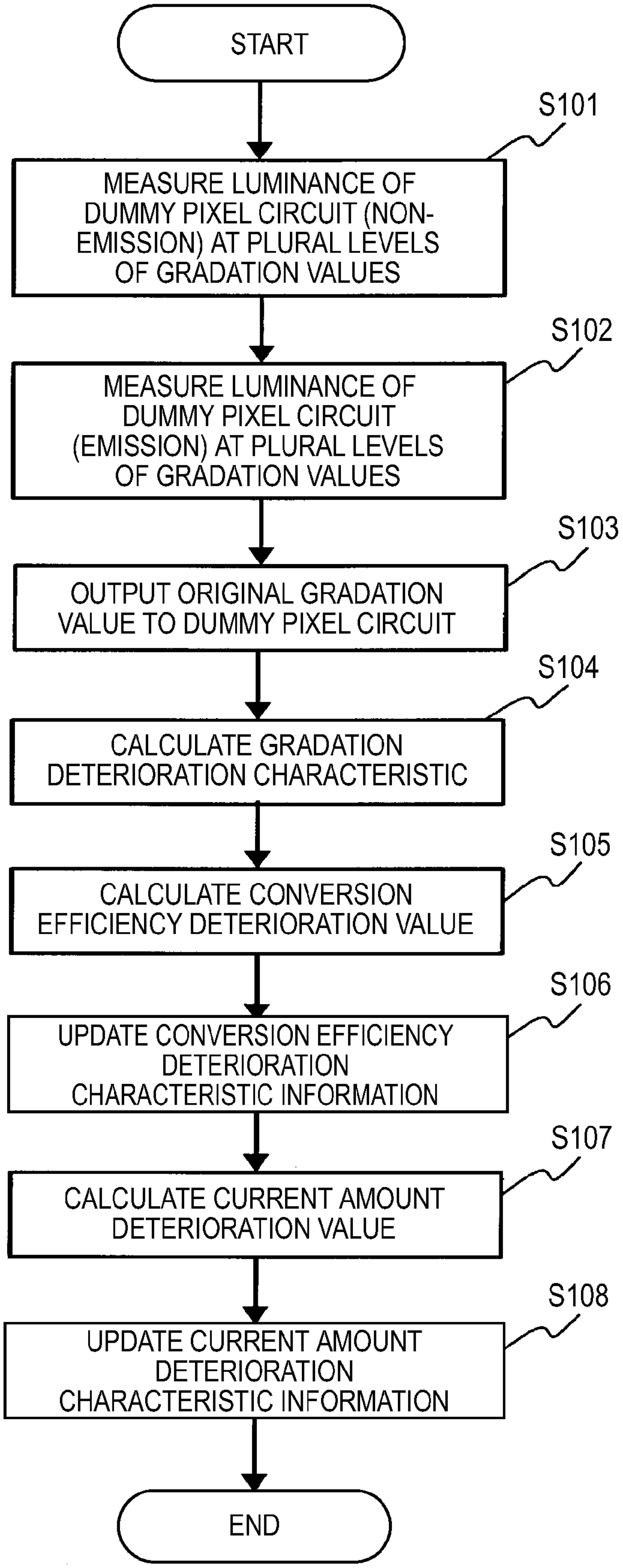
FIG. 16 is a flowchart showing an example of the procedure of a deterioration characteristic information generation process by the deterioration characteristic information generation unit.

Next, the operation of the deterioration characteristic information generation unit 250 of the burn-in correction unit 200 will be described with reference to drawings. FIG. 16 is a flowchart showing an example of the procedure of a deterioration characteristic information generation process by the deterioration characteristic information generation unit. In FIG. 16, it is assumed that the dummy pixel circuit 609 includes the dummy pixel circuit (non-emission) 609*a* which is driven so as not to emit light and the dummy pixel circuit (emission) 609*b* which is driven so as to emit light at prescribed luminance.

[Step S101]

The measuring unit 251 sets a plurality of levels of gradation values to the dummy pixel circuit (non-emission) 609*a* based on a prescribed gradation value pattern. Moreover, the measuring unit 251 measures the luminance of the dummy pixel circuit (non-emission) 609*a* when the respective levels of gradation values are set thereto, and supplies the measured luminance to the measurement information holding unit 252 so as to be correlated with the respective gradation values. The measurement information holding unit 252 holds the supplied measurement information on the dummy pixel circuit (non-emission) 609*a*.

[Step S102]

The measuring unit 251 sets a plurality of levels of gradation values to the dummy pixel circuit (emission) 609*b* based on a prescribed gradation value pattern. In this example, it is assumed that the gradation value pattern is the same as the gradation value pattern used in step S101. Moreover, the measuring unit 251 measures the luminance of the dummy pixel circuit (emission) 609*b* when the respective levels of gradation values are set thereto, and supplies the measured luminance to the measurement information holding unit 252 so as to be correlated with the respective gradation values. The measurement information holding unit 252 holds the measurement information (emission) for the dummy pixel circuit (emission) 609*b* and the measurement information (non-emission) for the dummy pixel circuit (non-emission) 609*a* generated in step S101.

[Step S103]

The measuring unit 251 sets the original gradation values, which were set to the dummy pixel circuit (non-emission) 609*a* and the dummy pixel circuit (emission) 609*b* before the measurement process starts, to the respective dummy pixel circuits. Specifically, the measuring unit 251 sets a gradation value to the dummy pixel circuit (non-emission) 609*a* so as not to emit light. Moreover, the measuring unit 251 sets a prescribed gradation value determined in advance to the dummy pixel circuit (emission) 609*b*. In this way, it is possible to obtain the measurement information of each of the dummy pixel circuit (non-emission) 609*a* which can be considered to be in the initial state where no deterioration occurs and the dummy pixel circuit (emission) 609*b* in which deterioration progresses due to continuous driving with the prescribed gradation value.

[Step S104]

The gradation deterioration characteristic calculation unit 253 calculates the gradation deterioration characteristic based on the measurement information of the dummy pixel circuit (non-emission) 609*a* and the measurement information of the dummy pixel circuit (emission) 609*b* held by the measurement information holding unit 252. For example, the gradation deterioration characteristic calculation unit 253 calculates a gradation value (referred to as a conversion gradation value) of the dummy pixel circuit (non-emission) 609*a*, at which the same luminance as the gradation value (referred to as an input gradation value) of the dummy pixel circuit (emission) 609*b* can be obtained, based on the measurement information representing the relationship between the luminance and the gradation value of each pixel circuit. Moreover, the conversion gradation value is correlated with the input gradation value to generate gradation deterioration information, and the gradation deterioration information is supplied to the gradation deterioration information holding unit 254. The gradation deterioration information holding unit 254 holds the supplied gradation deterioration characteristic information.

[Step S105]

The conversion efficiency deterioration value calculation unit 255 calculates the slope of a gradation deterioration characteristic approximation straight line which represents the relationship between the input gradation value and the conversion gradation value as an approximation straight line based on the gradation deterioration information held by the gradation deterioration information holding unit 254. Moreover, the conversion efficiency deterioration value calculation unit 255 applies the calculated slope to Equation (10) to calculate the ΔSlope and uses the calculated ΔSlope as the conversion efficiency deterioration value.

[Step S106]

The conversion efficiency deterioration value calculation unit 255 corrects the master curve of the conversion efficiency deterioration characteristic information held by the conversion efficiency deterioration characteristic holding unit 256 using the conversion efficiency deterioration value calculated in step S105 to thereby update the conversion efficiency deterioration characteristic information.

[Step S107]

The current amount deterioration value calculation unit 257 calculates the intercept of the gradation deterioration characteristic approximation straight line, which represents the relationship between the input gradation value and the conversion gradation value as an approximation straight line, based on the gradation deterioration information held by the gradation deterioration information holding unit 254. Moreover, the current amount deterioration value calculation unit 257 applies the calculated intercept and the slope of the gradation deterioration characteristic approximation straight line calculated in step S105 to Equation (10) to calculate the ΔGradation and uses the calculated ΔGradation as the current amount deterioration value.

[Step S108]

The current amount deterioration value calculation unit 257 corrects the master curve of the current amount deterioration characteristic information held by the current amount deterioration characteristic holding unit 258 using the current amount deterioration value calculated in step S107 to thereby update the current amount deterioration characteristic information.

By executing the above processing procedure, a plurality of levels of gradation values is set to the dummy pixel circuit (non-emission) 609*a* and the dummy pixel circuit (emission) 609*b*, and the luminance values are measured. Then, the conversion gradation value of the dummy pixel circuit (non-emission) 609*a* producing the same luminance as the input gradation value of the dummy pixel circuit (emission) 609*b* is calculated based on the luminance value measured for each gradation value. Furthermore, the conversion efficiency deterioration characteristic information and the current amount deterioration characteristic information are updated based on the gradation deterioration characteristic information representing the relationship between the input gradation value and the conversion gradation value. In this way, it is possible to obtain highly accurate conversion efficiency deterioration characteristic information and current amount deterioration characteristic information based on the actual measurement values. Moreover, by correcting the gradation value of a video signal based on the highly accurate conversion efficiency deterioration characteristic information and current amount deterioration characteristic information, it is possible to perform burn-in correction with high accuracy.

When there is one dummy pixel circuit 609, the dummy pixel circuit 609 is used as the dummy pixel circuit (emission) 609*b*. Moreover, the measurement information obtained by measuring the gradation value and the luminance when the dummy pixel circuit (emission) 609*b* is in the initial state is stored in advance. Then, the same process is performed using the measurement information in the initial state and the measurement information of the dummy pixel circuit (emission) 609*b* measured by the measuring unit 251.

The display device 100 described can be applied to a display which has a flat panel shape and is included in any of various kinds of electronic apparatus such as, for example, a digital camera, a notebook personal computer, a cellular phone, or a video camera. Specifically, the display device can be applied to a display of electronic apparatus in any field, capable of displaying a video signal input to the electronic apparatus or generated in the electronic apparatus as an image or a video. Examples of an electronic apparatus to which such a display device 100 is applied will be described below.

[Application Example to Electronic Apparatus]

Figure 17:
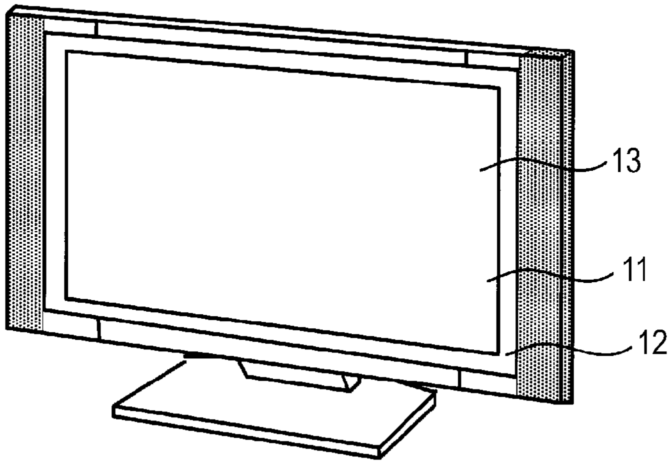
FIG. 17 is a perspective view showing a television set including the display device according to the embodiment of the present disclosure.

FIG. 17 is a perspective view showing a television set including the display device according to the embodiment of the present disclosure. The television set shown in FIG. 17 includes a video display screen 11 including a front panel 12, a filter glass 13, and the like, and is manufactured by using the display device 100 as the video display screen 11.

Figure 18:
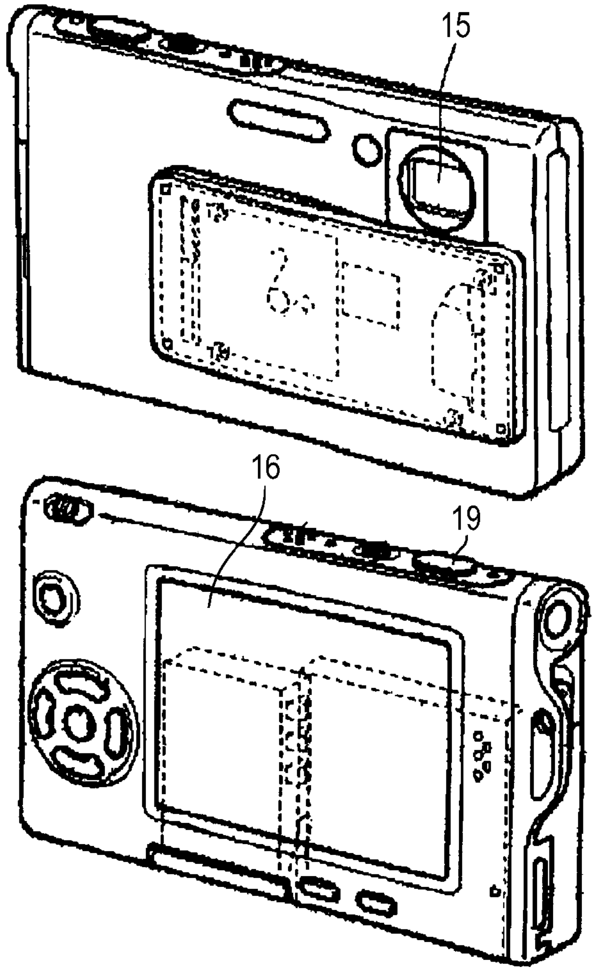
FIG. 18 is a perspective view showing a digital still camera including the display device according to the embodiment of the present disclosure.

FIG. 18 is a perspective view showing a digital still camera including the display device according to the embodiment of the present disclosure. In FIG. 18, the front view of the digital still camera is shown on the upper part, and the rear view of the digital still camera is shown on the lower part. The digital still camera shown in FIG. 18 includes an imaging lens, a flash light emitter 15, a display unit 16, a control switch, a menu switch, a shutter button 19, and the like, and is manufactured by using the display device 100 as the display unit 16.

Figure 19:
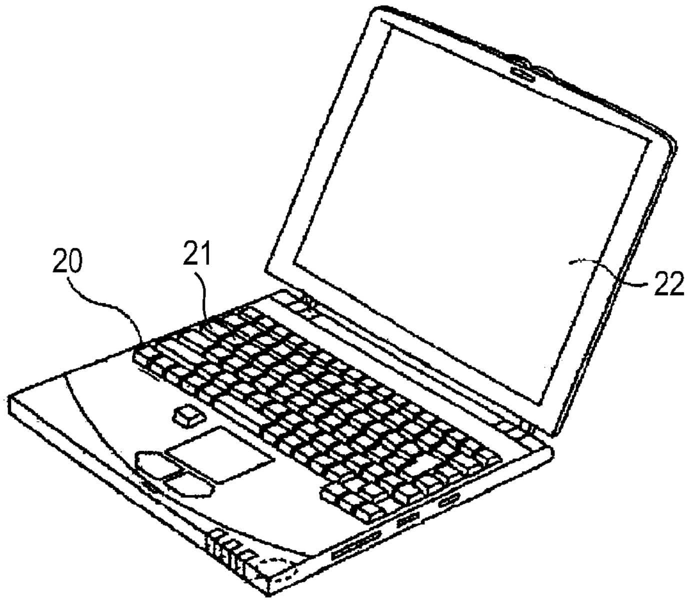
FIG. 19 is a perspective view showing a notebook personal computer including the display device according to the embodiment of the present disclosure.

FIG. 19 is a perspective view showing a notebook personal computer including the display device according to the embodiment of the present disclosure. The notebook personal computer shown in FIG. 19 includes a main body 20, a keyboard 21 that is included in the main body 20 and operated when inputting characters and the like, and a display unit 22 which is included in a main body cover so as to display an image. The notebook personal computer is manufactured by using the display device 100 as the display unit 22.

Figure 20:
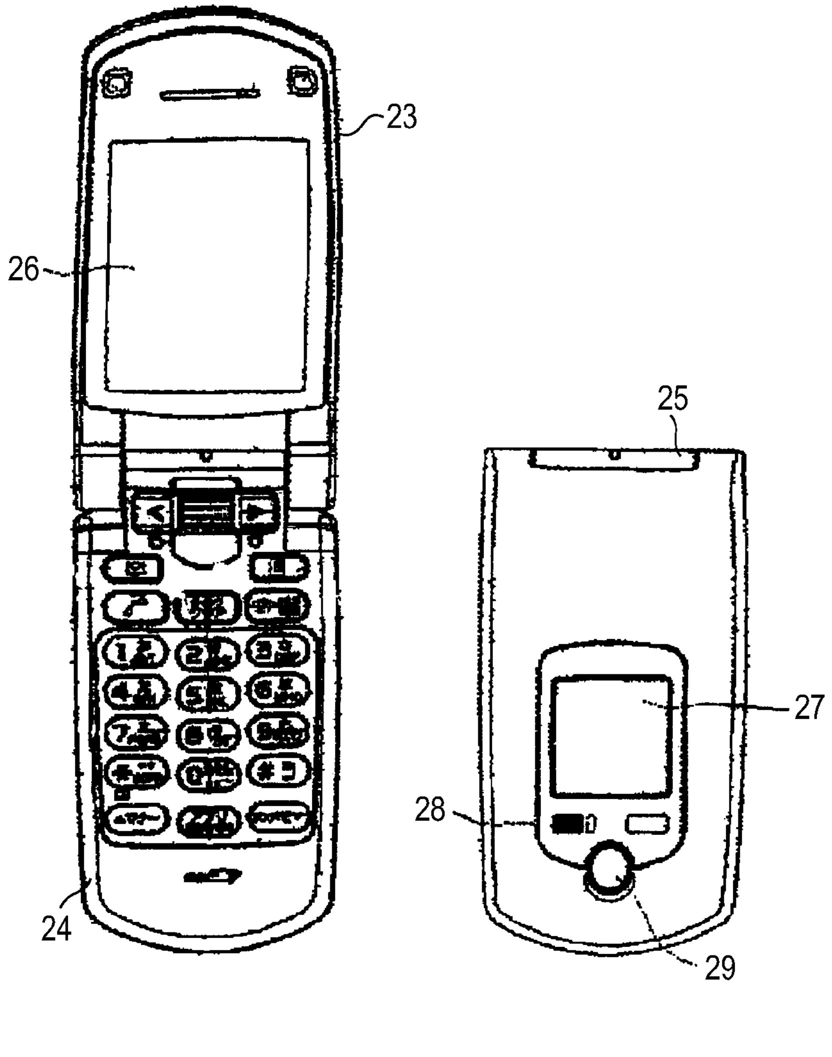
FIG. 20 is a schematic diagram showing portable terminal including the display device according to the embodiment of the present disclosure.

FIG. 20 is a schematic view showing a portable terminal including the display device according to the embodiment of the present disclosure. In FIG. 20, the open state of the portable terminal is shown on the left side, and the closed state of the portable terminal is shown on the right side. The portable terminal shown in FIG. 20 includes an upper housing 23, a lower housing 24, a connecting portion (in this example, a hinge) 25, a display 26, a sub-display 27, a picture light 28, a camera 29, and the like. The portable terminal is manufactured by using the display device 100 as the display 26 or the sub-display 27.

Figure 21:
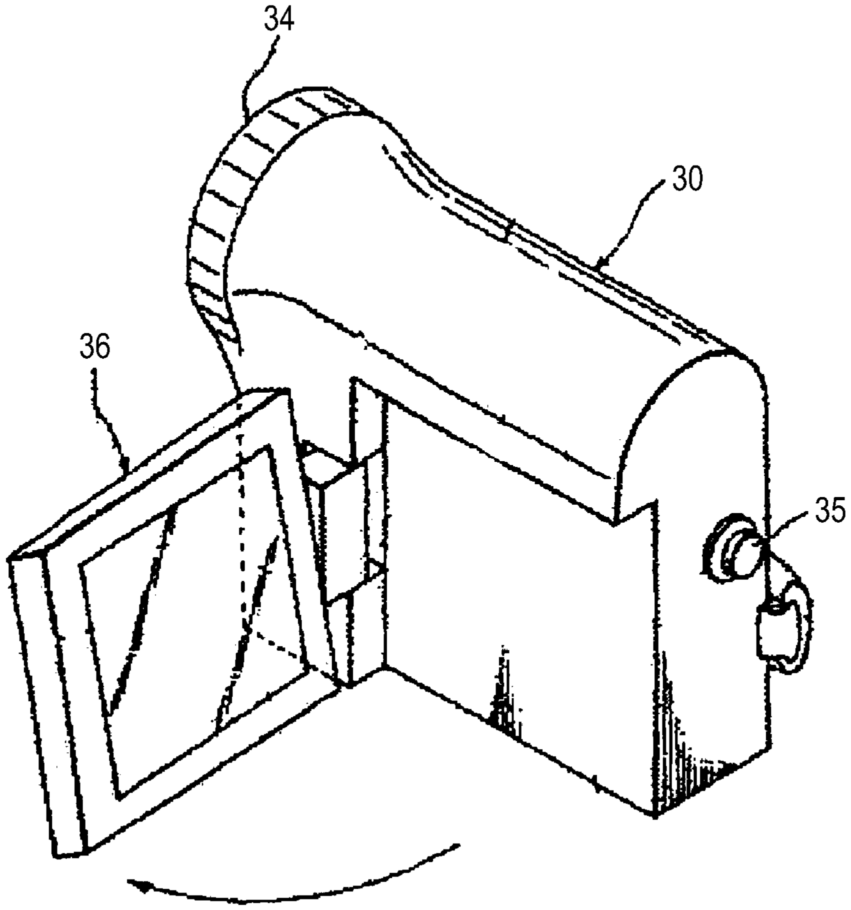
FIG. 21 is a perspective view showing a video camera including the display device according to the embodiment of the present disclosure.

FIG. 21 is a perspective view showing a video camera including the display device according to the embodiment of the present disclosure. The video camera shown in FIG. 21 includes a main body portion 30, a lens 34 that is disposed on a side surface facing the front side and used for photographing a subject, a switch 35 for starting and stopping photography, a monitor 36, and the like. The video camera is manufactured by using the display device 100 as the monitor 36.

According to the electronic apparatuses described above, since deterioration components of conversion efficiency, in particular, can be obtained with high accuracy, it is possible to resolve burn-in with high accuracy.

The processing functions described above can be realized by a computer. In this case, a program describing the processing content of functions which are to be included in a signal processing device, a display device, and an electronic apparatus is provided. When the program is executed by a computer, the processing functions are realized on the computer. The program describing the processing content may be recorded on a computer-readable recording medium. Examples of the computer-readable recording medium include a magnetic storage device, an optical disc, an opto-magnetic recording medium, and a semiconductor memory. Examples of the magnetic storage device include a hard disk device (HDD), a flexible disk (FD), and a magnetic tape. Examples of the optical disc includes a DVD, a DVD-RAM, a CD-ROM/RW. Examples of the opto-magnetic recording medium include a MO (Magneto-Optical disc).

When distributing the program, for example, a portable recording medium such as a DVD or a CD-ROM in which the program is recorded is sold. Moreover, the program may be stored in a storage device of a server computer so that the program can be transmitted from the server computer to another computer through a network.

The computer executing the program stores, for example, the program recorded on a portable recording medium or the program transmitted from the server computer in a subject storage device. Then, the computer reads the program from the subject storage device and executes processes in accordance with the program. In addition, the computer may read the program directly from a portable recording medium and execute processes in accordance with the program. Moreover, the computer may sequentially execute processes in accordance with the received program whenever the program is transmitted from the server computer connected through a network.

Moreover, at least part of the processing functions described above may be realized by an electronic circuit such as a DSP (Digital Signal Processor), an ASIC, or a PLD (Programmable Logic Device).

The present disclosure contains subject matter related to that disclosed in Japanese Priority Patent Application JP 2010-291840 filed in the Japan Patent Office on Dec. 28, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device comprising:

a measuring unit that measures an actual luminance of a light-emitting device every prescribed update period by setting a plurality of levels of gradation values indicating the degree of light emission to a prescribed pixel circuit having the light-emitting device to thereby generate measurement information in which the gradation value and the measured luminance value are correlated with each other;

a gradation deterioration characteristic calculation unit that calculates gradation deterioration characteristic based on the measurement information and a relationship registered in advance between a gradation value and a luminance value when the prescribed pixel circuit is in a correction reference state, wherein a gradation value during measurement and a gradation value in the correction reference state producing the same luminance value are stored in the gradation deterioration information holding unit so as to be correlated with each other;

a conversion efficiency deterioration value calculation unit that calculates a conversion efficiency deterioration value regarding deterioration of a conversion efficiency for the light-emitting device of the prescribed pixel circuit to convert a driving current supplied in accordance with a gradation value into a luminance based on the gradation deterioration characteristic to thereby generate conversion efficiency deterioration characteristic information of the prescribed pixel circuit; and a current amount deterioration value calculation unit that calculates a current amount deterioration value regarding deterioration of a driving current of the prescribed pixel circuit based on the gradation deterioration characteristic to thereby generate current amount deterioration characteristic information of the prescribed pixel circuit.

2. The signal processing device according to claim 1, wherein the conversion efficiency deterioration value calculation unit approximates the gradation deterioration characteristic to a straight line and calculates the conversion efficiency deterioration value based on a slope of an approximation straight line of the gradation deterioration characteristic, and wherein the current amount deterioration value calculation unit calculates the current amount deterioration value based on an intercept of the approximation straight line of the gradation deterioration characteristic.

3. The signal processing device according to claim 1, wherein the conversion efficiency deterioration value calculation unit stores conversion efficiency deterioration characteristic information, in which an elapsed time accumulated from the correction reference state is correlated with an estimated value of a conversion efficiency deterioration value in the prescribed update period when the prescribed pixel circuit is driven with a certain gradation value with the timepoint at which the prescribed pixel circuit is the correction reference state being a start point, in advance in a conversion efficiency deterioration characteristic holding unit and updates the conversion efficiency deterioration characteristic information held in the conversion efficiency deterioration characteristic holding unit in accordance with the conversion efficiency deterioration value based on the calculated conversion efficiency deterioration value, and wherein the current amount deterioration value calculation unit stores current amount deterioration characteristic information, in which the elapsed time is correlated with an estimated value of a current amount deterioration value in the prescribed update period, in advance in current amount deterioration characteristic holding unit and updates the current amount deterioration characteristic information held in the current amount deterioration characteristic holding unit in accordance with the current amount deterioration value based on the calculated current amount deterioration value.

4. The signal processing device according to claim 1, further comprising a dummy pixel circuit which can be driven by setting a gradation value of an optional magnitude thereto, wherein the measuring unit uses the dummy pixel circuit as the prescribed pixel circuit.

5. The signal processing device according to claim 1, wherein the measuring unit drives a first pixel circuit with a prescribed gradation value excluding a luminance measurement period and measures luminance values corresponding to the plurality of levels of gradation values set in the update period to thereby generate first measurement information, wherein the measuring unit drives a second pixel circuit having the same configuration as the first pixel circuit in a non-emission state excluding the luminance measurement period and measures luminance values corresponding to the plurality of levels of gradation values set in the update period to thereby generate second measurement information, and wherein the second measurement information is considered to represent a gradation value and a luminance value when the first pixel circuit is in the correction reference state.

6. The signal processing device according to claim 5, further comprising at least two dummy pixel circuits, wherein the measuring unit uses at least one of the dummy pixel circuits as the first pixel circuit which is driven with the prescribed gradation value excluding the luminance measurement period, and wherein the measuring unit uses a dummy pixel circuit different from the dummy pixel circuit which is driven with the prescribed gradation value as the second pixel circuit which is driven in a non-emission state excluding the luminance measurement period.

7. A signal processing method comprising:

measuring an actual luminance of a light-emitting device every prescribed update period by setting a plurality of levels of gradation values indicating the degree of light emission to a pixel circuit having the light-emitting device to thereby generate measurement information in which the gradation value and the measured luminance value are correlated with each other;

calculating gradation deterioration characteristic based on the measurement information and a relationship registered in advance between a gradation value and a luminance value when the prescribed pixel circuit is in a correction reference state, wherein a gradation value during measurement and a gradation value in the correction reference state producing the same luminance value are stored in the gradation deterioration information holding unit so as to be correlated with each other;

calculating a conversion efficiency deterioration value regarding deterioration of a conversion efficiency for the light-emitting device of the prescribed pixel circuit to convert a driving current supplied in accordance with a gradation value into a luminance based on the gradation deterioration characteristic to thereby generate conversion efficiency deterioration characteristic information of the prescribed pixel circuit; and calculating a current amount deterioration value regarding deterioration of a driving current of the prescribed pixel circuit based on the gradation deterioration characteristic to thereby generate current amount deterioration characteristic information of the prescribed pixel circuit.

8. A signal processing method comprising:

measuring a luminance of a light-emitting device of a prescribed pixel circuit having the light-emitting device every prescribed update period to thereby generate measurement information in which a gradation value and the measured luminance value are correlated with each other;

calculating gradation deterioration characteristic based on the measurement information and a relationship between a luminance value and a gradation value in a correction reference state of the prescribed pixel circuit, wherein a gradation value during measurement and a gradation value in the correction reference state producing the same luminance value are stored in the gradation deterioration information holding unit so as to be correlated with each other;

calculating a conversion efficiency deterioration value regarding deterioration of a conversion efficiency for the light-emitting device of the prescribed pixel circuit to convert a driving current supplied in accordance with a gradation value into a luminance based on the gradation deterioration characteristic; and calculating a current amount deterioration value regarding deterioration of a driving current of the prescribed pixel circuit based on the gradation deterioration characteristic to thereby generate current amount deterioration characteristic information of the prescribed pixel circuit.

9. A display device comprising:

a plurality of pixel circuits each including a light-emitting device;

a measuring unit that measures an actual luminance of a light-emitting device every prescribed update period by setting a plurality of levels of gradation values indicating the degree of light emission to a prescribed pixel circuit having the light-emitting device to thereby generate measurement information in which the gradation value and the measured luminance value are correlated with each other;

a gradation deterioration characteristic calculation unit that calculates gradation deterioration characteristic based on the measurement information and a relationship registered in advance between a gradation value and a luminance value when the prescribed pixel circuit is in a correction reference state, wherein a gradation value during measurement and a gradation value in the correction reference state producing the same luminance value are stored in the gradation deterioration information holding unit so as to be correlated with each other;

a conversion efficiency deterioration value calculation unit that calculates a conversion efficiency deterioration value regarding deterioration of a conversion efficiency for the light-emitting device of the prescribed pixel circuit to convert a driving current supplied in accordance with a gradation value into a luminance based on the gradation deterioration characteristic to thereby generate conversion efficiency deterioration characteristic information of the prescribed pixel circuit;

a current amount deterioration value calculation unit that calculates a current amount deterioration value regarding deterioration of a driving current of the prescribed pixel circuit based on the gradation deterioration characteristic to thereby generate current amount deterioration characteristic information of the prescribed pixel circuit; and a correction computation unit that calculates conversion efficiency deterioration amounts of the plurality of pixel circuits based on the conversion efficiency deterioration characteristic information, corrects the gradation value of a video signal instructed with respect to the plurality of pixel circuits based on the conversion efficiency deterioration amounts, calculates current amount deterioration amounts of the plurality of pixel circuits based on the current amount deterioration characteristic information, and corrects the gradation value of the video signal corrected based on the conversion efficiency deterioration amount based on the current amount deterioration amounts.

10. An electronic apparatus comprising:

a plurality of pixel circuits each including a light-emitting device;

a measuring unit that measures an actual luminance of a light-emitting device every prescribed update period by setting a plurality of levels of gradation values indicating the degree of light emission to a prescribed pixel circuit having the light-emitting device to thereby generate measurement information in which the gradation value and the measured luminance value are correlated with each other;

a gradation deterioration characteristic calculation unit that calculates gradation deterioration characteristic based on the measurement information and a relationship registered in advance between a gradation value and a luminance value when the prescribed pixel circuit is in a correction reference state, wherein a gradation value during measurement and a gradation value in the correction reference state producing the same luminance value are stored in the gradation deterioration information holding unit so as to be correlated with each other;

a conversion efficiency deterioration value calculation unit that calculates a conversion efficiency deterioration value regarding deterioration of a conversion efficiency for the light-emitting device of the prescribed pixel circuit to convert a driving current supplied in accordance with a gradation value into a luminance based on the gradation deterioration characteristic to thereby generate conversion efficiency deterioration characteristic information of the prescribed pixel circuit;

a current amount deterioration value calculation unit that calculates a current amount deterioration value regarding deterioration of a driving current of the prescribed pixel circuit based on the gradation deterioration characteristic to thereby generate current amount deterioration characteristic information of the prescribed pixel circuit; and a correction computation unit that calculates conversion efficiency deterioration amounts of the plurality of pixel circuits based on the conversion efficiency deterioration characteristic information, corrects the gradation value of a video signal instructed with respect to the plurality of pixel circuits based on the conversion efficiency deterioration amounts, calculates current amount deterioration amounts of the plurality of pixel circuits based on the current amount deterioration characteristic information, and corrects the gradation value of the video signal corrected based on the conversion efficiency deterioration amount based on the current amount deterioration amounts.

* * * * *